US012453580B2

(12) United States Patent
Rafiee et al.

(10) Patent No.: US 12,453,580 B2
(45) Date of Patent: Oct. 28, 2025

(54) ACCESS CATHETER

(71) Applicant: Transmural Systems LLC, Andover, MA (US)

(72) Inventors: Nasser Rafiee, Andover, MA (US); Stuart Macdonald, Andover, MA (US); Koosha Rafiee, Andover, MA (US)

(73) Assignee: Transmural Systems LLC, Andover, MA (US)

( * ) Notice: Subject to any disclaimer, the term of this patent is extended or adjusted under 35 U.S.C. 154(b) by 412 days.

(21) Appl. No.: 17/709,869

(22) Filed: Mar. 31, 2022

(65) Prior Publication Data

US 2022/0330975 A1 Oct. 20, 2022

Related U.S. Application Data

(63) Continuation-in-part of application No. PCT/US2022/018585, filed on Mar. 2, 2022.

(60) Provisional application No. 63/155,707, filed on Mar. 2, 2021.

(51) Int. Cl.
*A61B 17/34* (2006.01)
*A61B 17/00* (2006.01)
*A61M 25/09* (2006.01)

(52) U.S. Cl.
CPC ............. *A61B 17/3423* (2013.01); *A61B 2017/00292* (2013.01); *A61B 2017/3486* (2013.01); *A61M 25/09* (2013.01)

(58) Field of Classification Search
CPC ..... A61B 17/3423; A61B 2017/00292; A61M 25/09; A61M 2025/0096
See application file for complete search history.

(56) References Cited

U.S. PATENT DOCUMENTS

| 5,895,404 | A |   | 4/1999 | Ruiz |
|---|---|---|---|---|
| 5,911,725 | A | * | 6/1999 | Boury ............... A61B 17/22031 606/108 |
| 6,190,353 | B1 | * | 2/2001 | Makower ......... A61B 17/12131 600/137 |
| 6,226,554 | B1 |   | 5/2001 | Tu et al. |
| 6,379,319 | B1 |   | 4/2002 | Garibotto et al. |
| 7,678,081 | B2 |   | 3/2010 | Whiting et al. |

(Continued)

FOREIGN PATENT DOCUMENTS

WO 2022011348 A1 1/2022

OTHER PUBLICATIONS

Written Opinion of International Searching Authority dated May 23, 2022 in International Application No. 018585.
(Continued)

*Primary Examiner* — Brooke Labranche
(74) *Attorney, Agent, or Firm* — DeWitt LLP; Brian R. Pollack, Esq.

(57) ABSTRACT

The present disclosure relates to novel and advantageous systems and methods for deploying a surgical tool or guidewire. Particularly, the present disclosure relates to novel and advantageous systems and methods for deploying a surgical tool for use in changing the shape of portions of luminal systems. More particularly, the present disclosure relates to novel and advantageous systems and methods including an access catheter to direct an implement, such as a guide wire, off axis into a wall of a vessel or a wall of a tissue structure.

20 Claims, 40 Drawing Sheets

(56) References Cited

U.S. PATENT DOCUMENTS

| | | | |
|---|---|---|---|
| 9,345,858 | B2 | 5/2016 | Flaherty et al. |
| 9,949,652 | B2 | 4/2018 | Fischell et al. |
| 2003/0032936 | A1 | 2/2003 | Lederman |
| 2004/0097973 | A1 | 5/2004 | Loshakove et al. |
| 2004/0158143 | A1 | 8/2004 | Flaherty et al. |
| 2004/0162599 | A1 | 8/2004 | Kurth |
| 2004/0210190 | A1 | 10/2004 | Kohler et al. |
| 2007/0142819 | A1 | 6/2007 | El-Nounou et al. |
| 2012/0004647 | A1* | 1/2012 | Cowley ............... A61B 17/221 606/1 |
| 2016/0303348 | A1* | 10/2016 | Leung ............... A61M 25/0108 |
| 2018/0000588 | A1 | 1/2018 | Perkins et al. |
| 2018/0056045 | A1* | 3/2018 | Donoghue ........ A61M 25/0068 |
| 2020/0163566 | A1 | 5/2020 | Fischell et al. |
| 2020/0246046 | A1 | 8/2020 | Gammie et al. |
| 2021/0212755 | A1* | 7/2021 | Jimenez ............... A61B 18/02 |
| 2022/0000544 | A1* | 1/2022 | Rafiee ................... A61M 25/09 |
| 2023/0190331 | A1 | 6/2023 | Kugler et al. |

OTHER PUBLICATIONS

International Search Report of International Searching Authority dated Jun. 16, 2022 in International Application No. 018585.
Supplementary European Search Report for EP Application No. 22764011.7, dated Dec. 5, 2024, 8 pages.

* cited by examiner

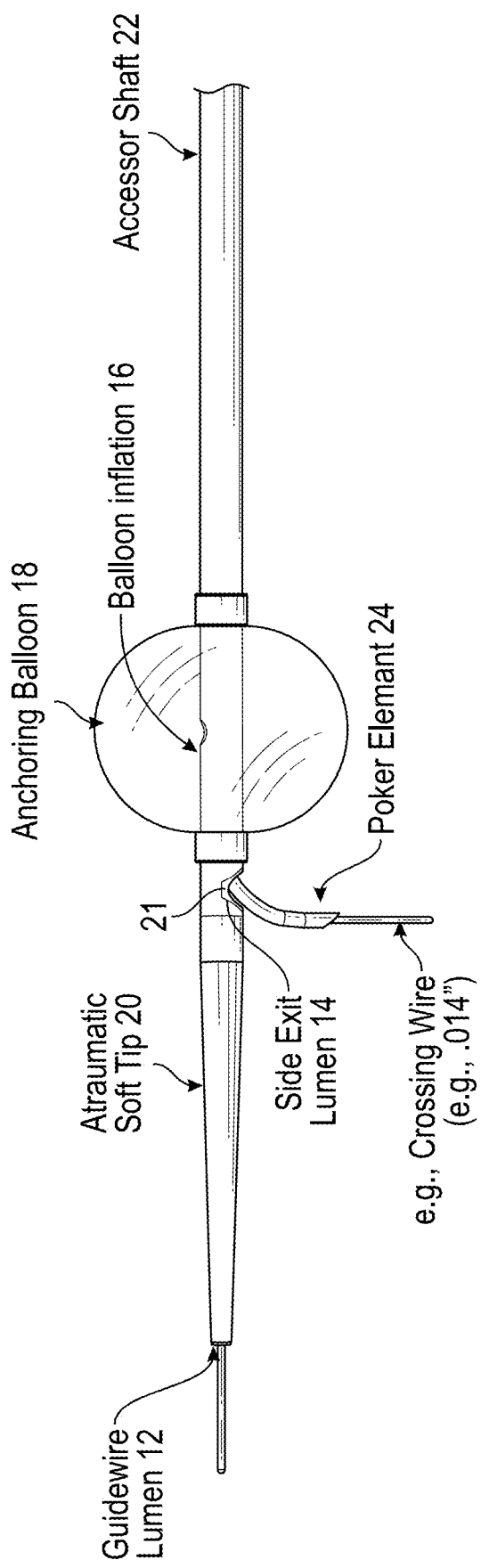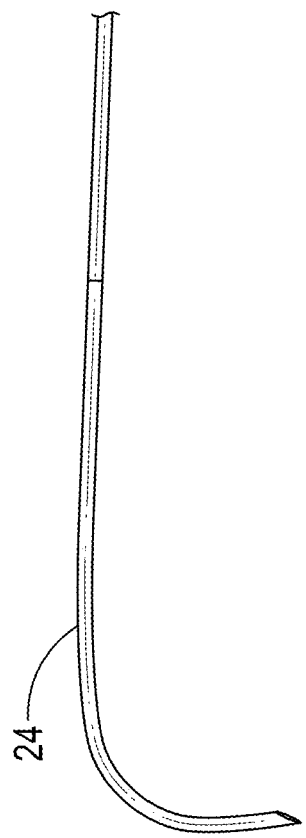
FIG. 1A
FIG. 1B

| Part | ID | OD | Usable Length |
|---|---|---|---|
| Main Shaft | .092" | .108" | 105cm |
| Guidewire Lumen | .039" | .047" | NA |
| Puncture Catheter Lumen | .039" | .047" | NA |
| Anchoring Balloon | ~2cm" Long | ~10-15mm Dia. | 15mm |
| Puncture Catheter | .018" | W/Outer support ~.031" | ~115cm |

FIG. 4

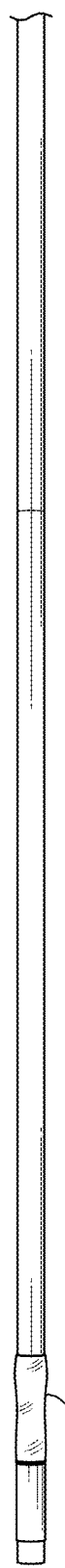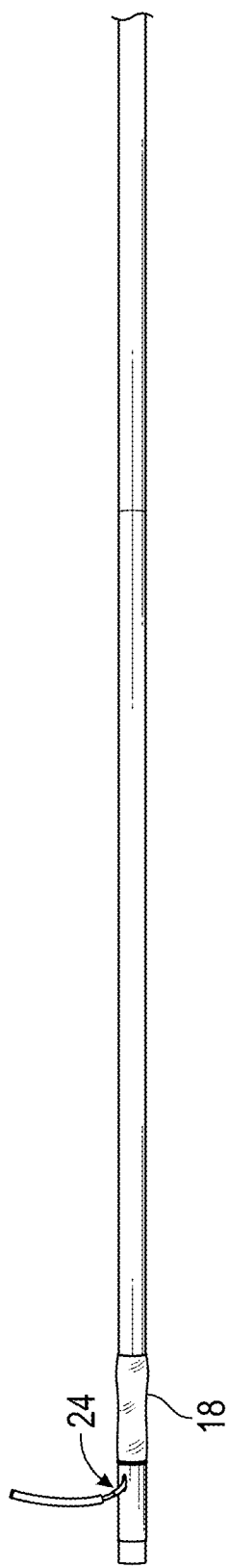

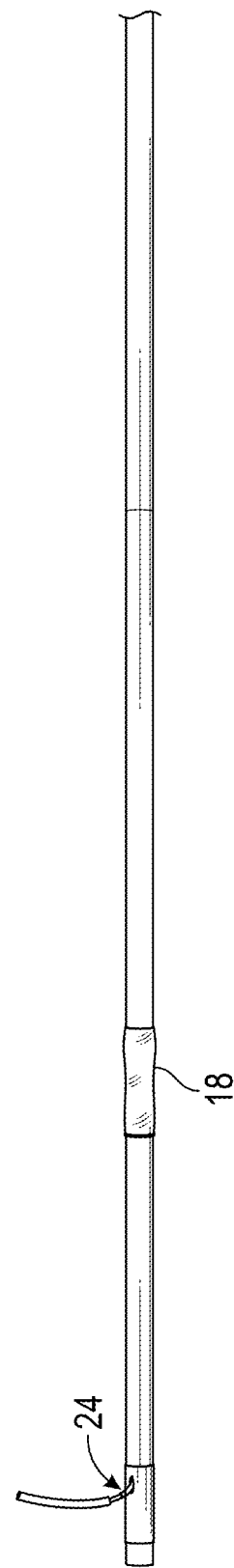

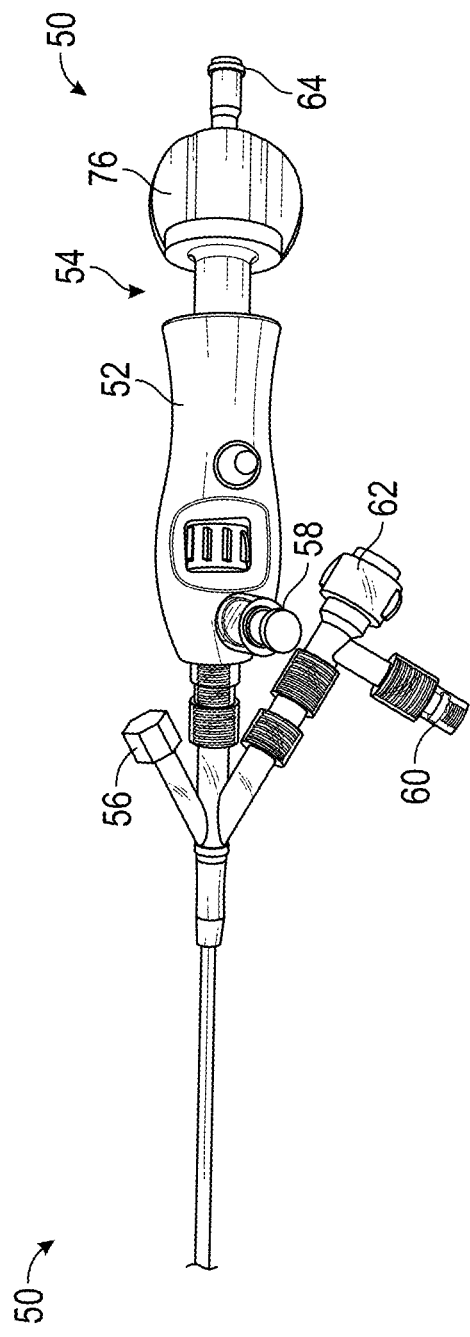
FIG. 9
FIG. 10A

232

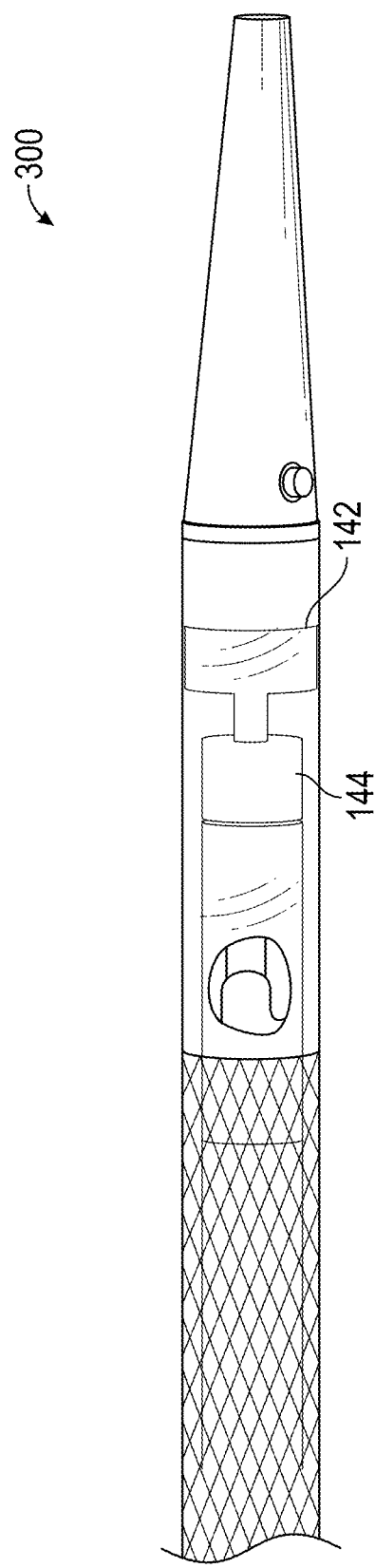

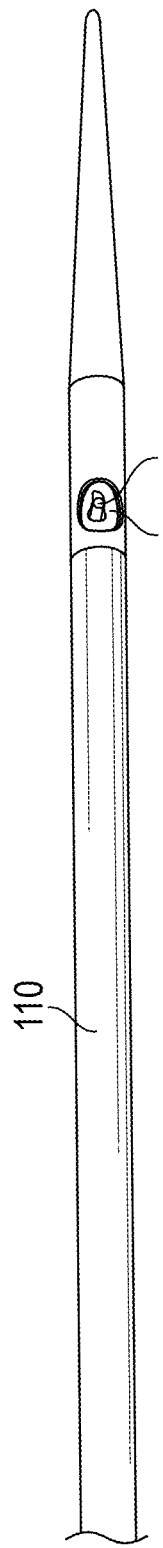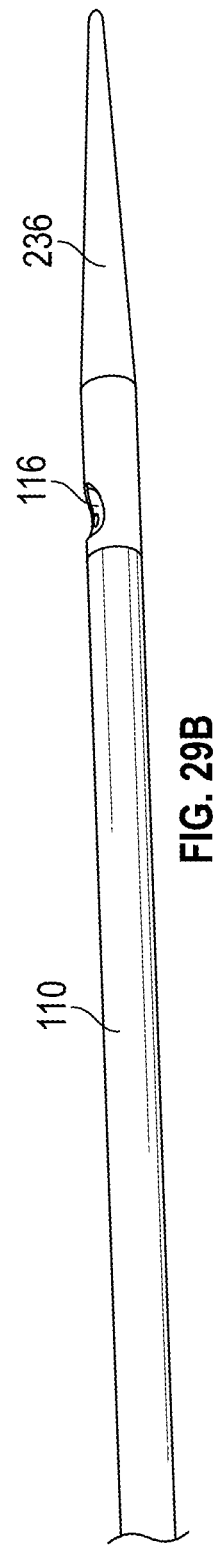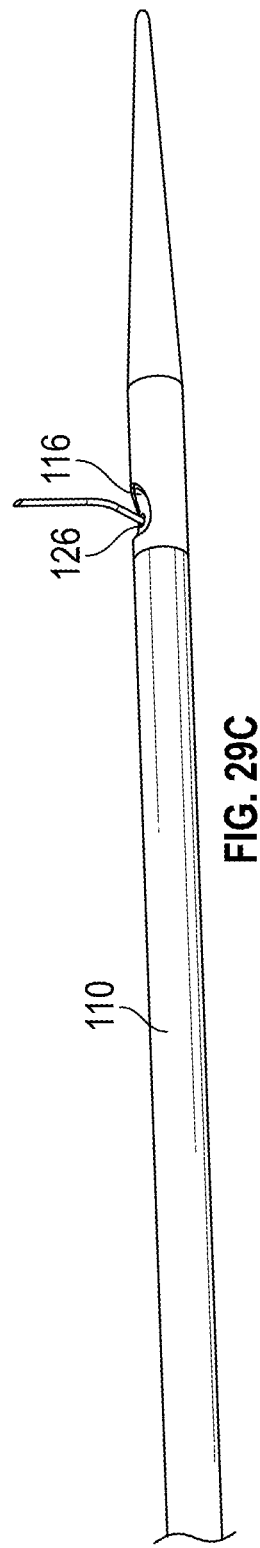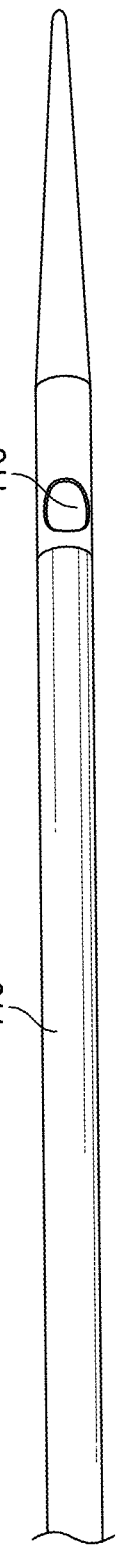

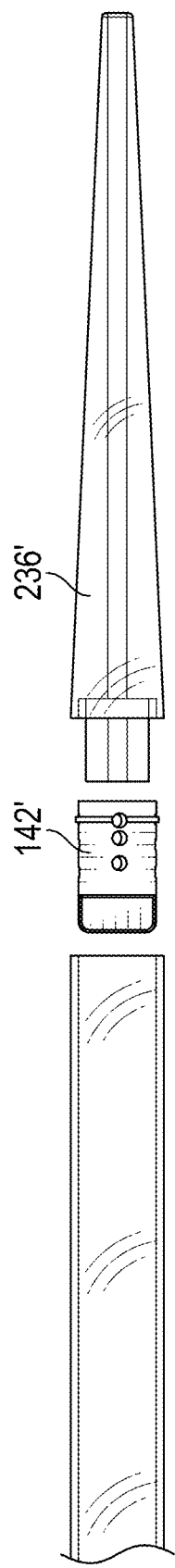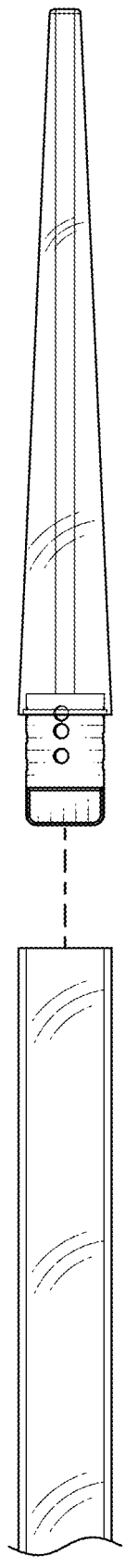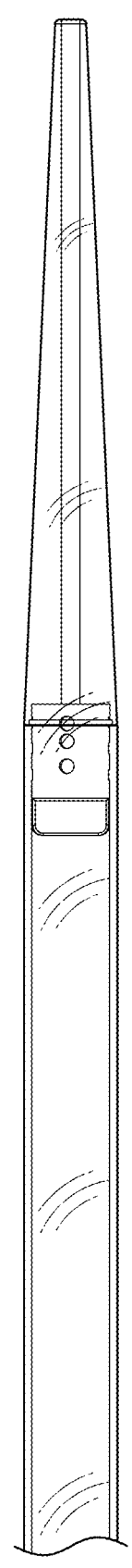

ACCESS CATHETER

CROSS-REFERENCE TO RELATED APPLICATIONS

The present patent application is a continuation-in-part of and claims the benefit of priority to International Patent Application No. PCT/US2022/018585, filed Mar. 2, 2022, which in turn claims the benefit of priority to U.S. Provisional Application No. 63/155,707, filed 2 Mar. 2021. The content of each of the aforementioned patent applications is hereby incorporated by reference herein in its entirety for all purposes.

FIELD OF THE DISCLOSURE

The present disclosure relates to novel and advantageous systems and methods for deploying a surgical tool or guidewire. Particularly, the present disclosure relates to novel and advantageous systems and methods for deploying a surgical tool for use in changing the shape of portions of luminal systems. More particularly, the present disclosure relates to novel and advantageous systems and methods including an access catheter to facilitate tunneling into the tissue of a wall of a luminal system.

BACKGROUND OF THE DISCLOSURE

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many devices and systems exist for accessing and traversing tissue structures. The present disclosure provides improved devices and related methods that are believed to improve significantly upon the state of the art.

BRIEF SUMMARY OF THE INVENTION

The following presents a simplified summary of one or more aspects of the present disclosure in order to provide a basic understanding of various implementations described by the present disclosure. This summary is not an extensive overview of all contemplated embodiments, and is intended to neither identify key or critical elements of all embodiments, nor delineate the scope of any or all embodiments.

The present disclosure relates to novel and advantageous systems and methods for deploying a surgical implement or guidewire. Particularly, the present disclosure relates to novel and advantageous systems and methods for deploying a surgical implement or tool off the axis of travel of a catheter, which can be challenging, particularly in the context of tunneling into the walls of tissue structures within a luminal system of a patient. In some aspects, the present disclosure relates to novel and advantageous systems and methods including an access catheter such as a myocardial access device for use with a system for cerclage of luminal systems. It will be appreciated however that the teachings of the present disclosure are germane to the design and implementation of medical devices for many different applications where a device that has been introduced percutaneously needs to be redirected along a significantly different direction of travel, such as an oblique or orthogonal direction of travel.

The present disclosure, in one or more embodiments, provides implementations of a system that facilitate guidewire deployment, for example, in a first direction followed by deployment in a second direction perpendicular or oblique to the first direction. This can be useful to tunnel into or pass through the wall of a tissue structure, such as to tunnel into the myocardium of a heart from a location within a chamber of a heart or within a vascular passageway defined within the heart. But, it will also be appreciated that such a device can be advantageously used to traverse a wall of a blood vessel to form an opening into the vessel wall to permit passage of a catheter for various purposes, such as delivering a vascular shunt or performing an end to side anastomosis procedure. For example, in accordance with some aspects, the present disclosure provides implementations of a system that facilitates achieving a 90 degree, or near 90 degree, turn of a guidewire during guidewire deployment.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

FIGS. 1A and 1B illustrate an access catheter in accordance with one embodiment of the present disclosure.

FIG. 4 is a table illustrating exemplary dimensions for parts of an access catheter, in accordance with one embodiment.

FIG. 7a illustrates an access device with a distal balloon location, in accordance with one embodiment.

FIG. 7b illustrates an access device with a distal balloon location, in accordance with one embodiment.

FIG. 8a illustrates an access device with a proximal balloon location, in accordance with one embodiment.

FIG. 8b illustrates an access device with a proximal balloon location, in accordance with one embodiment.

FIG. 9 illustrates an assembled access device with a hub coupled to the access catheter, in accordance with one embodiment.

FIG. 10a illustrates a close-up view of a hub, in accordance with one embodiment.

FIG. 14b illustrates an end view of the marker band of FIG. 14a.

FIG. 14c illustrates a side view of the marker band of FIG. 14a.

FIG. 14d illustrates a top view of the marker band of FIG. 14a.

FIG. 15b illustrates a top view of the marker band of FIG. 15a.

FIG. 15c illustrates a perspective view of the marker band of FIG. 15a.

FIG. 16b illustrates a perspective view of the marker band of FIG. 16a.

FIG. 16c illustrates an end view of the marker band of FIG. 16a.

FIG. 17b illustrates a top view of the marker band of FIG. 17a.

FIG. 17c illustrates a perspective view of the marker band of FIG. 17a.

FIGS. 26A-27 illustrate yet a further embodiment of an access catheter in accordance with the present disclosure.

FIGS. 29A-29D illustrate yet further aspects of an illustrative catheter in accordance with the present disclosure.

FIGS. 30A-30H present illustrative examples of distal tip construction of catheters in accordance with the present disclosure.

DETAILED DESCRIPTION

Figure 2A:
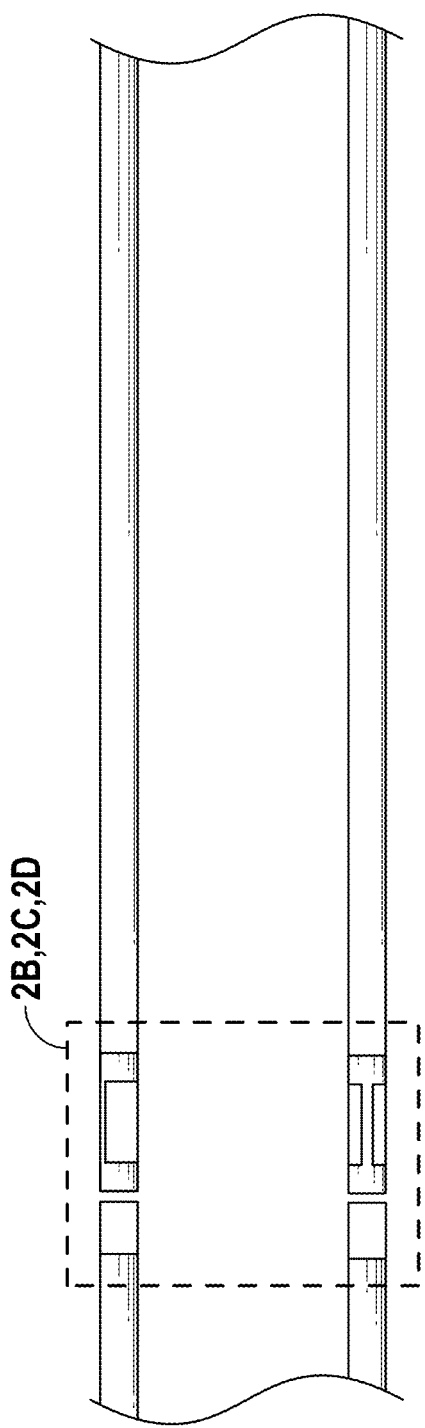
FIG. 2a illustrates an example of a marker band provided in or on an illustrative access catheter, in accordance with one contemplated embodiment.

The present disclosure relates to novel and advantageous systems and methods for deploying a surgical tool or implement, such as a guidewire. Particularly, the present disclosure relates to novel and advantageous systems and methods for deploying a surgical tool for use in changing the shape of portions of luminal systems or traversing wall structures of luminal systems. More particularly, the present disclosure relates to novel and advantageous systems and methods including an access catheter that can be used to access the myocardium of the heart of a patient from a passageway or chamber inside the heart. In various embodiments, a myocardial access device is provided that includes an access catheter and a hub that can be provided with a specially configured marker structure to help rotationally orient the access catheter to direct a guidewire or other implementation into a wall of a tissue structure along a predetermined direction. For the purposes of this description, proximal refers to towards the user or surgeon and distal refers to towards the patient.

There are procedures where it is desirable to advance a tool into a specific location in the human body. For example, there are procedures where it is desirable to advance a guidewire into the myocardium to define an elongate passageway. In accordance with the teachings herein, advancing the guidewire into the myocardium can include advancing an access catheter as described herein (also referred to as an accessor catheter), such as a centripetal access catheter, over the guidewire to aid in directing the guidewire into the myocardium. The access catheter can include a radiopaque marker at or near its distal end to indicate relative rotational position of the access catheter.

Implementations of an access catheter as set forth herein may be useful in MIRTH (Myocardial Intramural Restraint by endovenous interstitial teTHer) procedures. In MIRTH procedures, a guidewire is navigated inside the left ventricle muscle between adjacent tissue layers to create a deep sub-epicardial loop that encircles the left ventricle in order to apply tension and restrain or remodel the heart when it is pathologically dilated. The encirclement can be at the basal level, the mid-myocardial level, or any other level. Once the guidewire navigates this trajectory, it may be exchanged for a tension element (for example, an implant with tensioning tether) and a device to adjust or retain that tension and lock a desired amount of tension in place. Because of its subepicardial trajectory, there is no risk of coronary vascular entrapment, and reduced risk of high grade atrioventricular block upon application of tension. Moreover, a subepicardial tension element obviates the risk of pull-through of anchor-based annuloplasty or ventriculoplasty devices.

The pathway or trajectory created using the MIRTH procedure can be further exploited to enable MIRTH based pacing to achieve permanent cardiac pacing or cardiac resynchronization therapy when the native cardiac conduction system fails at the level of the AV node, the bundle of His, or any other level requiring permanent pacing (wherein solitary right ventricular pacing causes or exacerbates cardiomyopathy).

To access the myocardium, it is typically necessary for a guidewire to proceed laterally into tissue after having traversed a longitudinal direction. A centripetal access catheter is herein described that can be used to provide this initial access into the myocardium along a direction that is off of the axis of travel of the access catheter, such as oblique or orthogonal to the axis of travel of the access catheter.

The access catheter is used by advancing it over a guidewire to a target location where it is desired to tunnel into or through a vessel wall or into the myocardium. The catheter is advanced until a distal portion of the catheter passes the location to be punctured until a lateral or side exit port of the catheter is aligned with a location where the tissue is to be accessed. The access catheter can include a radiopaque marker that is near the exit port or that surrounds the exit port. The marker includes a configuration and shape that is not axisymmetric to permit a user to determine the rotational orientation of the catheter under a visualization modality so that the side exit port of the access catheter can be "aimed" at a target location to be punctured by the access catheter.

Once aligned, a distal end of a steering tube, or lumen, is advanced out of the side exit port of the catheter. The steering tube or lumen is preferably provided with a shape memory attribute to cause the tube to bend along a direction that is oblique or orthogonal with respect to a longitudinal direction of the access catheter. The steering tube or lumen extends from the distal end thereof along a proximal direction alongside or within an elongate body of the access catheter, wherein the steering tube or lumen preferably extends to a proximal region or end of the access catheter so as to permit the steering tube to be advanced along a proximal-distal direction with respect to the access catheter. As the steering tube is advanced along a distal direction then, the distal end of the steering tube peeks out through the side exit port of the catheter and aims toward a tissue structure to be traversed, such as a vessel wall or the myocardium, for example. The steering tube preferably includes a radiopaque coating or other coating and/or surface treatment to make it highly visible under one or more visualization modalities. The distal end region of the steering tube is then preferably able to be visualized with the aforementioned marker or markers that are near or that surround the side exit port to permit a cardiologist performing the procedure to view the placement and movement of the components of the catheter in real time. Once a cardiologist has confirmed that the steering tube is properly aimed toward a desired structure, a guidewire is then advanced through the steering tube and directed into the wall of the tissue structure (e.g., myocardium or vessel wall). The distal end of that guidewire is preferably electrically exposed and can be electrified to permit the guidewire to ablate the tissue and tunnel into the tissue along a direction that is oblique or orthogonal to the longitudinal axis of the access catheter.

In accordance with a further aspect of the disclosure, if so desired, the access catheter can be equipped with an inflatable member to help hold the access catheter in place proximate the target location to help facilitate the procedure. The balloon can be axisymmetric about the catheter, or can be eccentric so as to push the catheter toward or away from the wall that is to be tunneled into. The access catheter can be advanced in tandem with the electrosurgical guidewire. An angiography port may be provided on the catheter to aid in anatomic localization, and the centripetal access catheter may be provided with a small profile (e.g., 6-8 Fr) so it can also fit into a larger guiding catheter, such as a coronary sinus balloon-tip guiding sheath.

The present disclosure provides implementations of a system that facilitates guidewire deployment in a first direction followed by deployment in a second direction perpendicular or oblique with respect to the first direction, such as required for accessing the myocardium. More specifically, the present disclosure provides a system that facilitates achieving a 90 degree, or near 90 degree, turn of a guidewire during guidewire deployment.

FIGS. 1A-1B illustrate an access catheter 10 of a myocardial access device, in accordance with the present disclosure. The lumen of the access catheter may be lubricious and electrically insulated. The access catheter may have a lubricious outer surface to aid in navigation of coronary veins. The lubricious coating can include hydrophilic (e.g., PVP) material or hydrophobic (e.g., PTFE) material. In the illustrated embodiment, the access catheter 10 can include a guidewire lumen 12 to receive a guidewire for purposes of introducing the catheter 10 over a first guidewire that has previously been introduced and directed into a patient's vasculature.

As further illustrated in FIGS. 1A-1B, a side exit lumen 14, a balloon inflator or inflation point 16, one or more balloons 18, a tip 20, a shaft 22, and a steering or puncture lumen 24 are provided. The shaft 22 may be polymeric tubular member comprising an elongate body having a proximal end and a distal end and may be considered a main body of the access catheter 10. The shaft 22 can be any desired profile, but in this example is illustrated as being 8 French in profile. Shaft 22 can be comprised of an extrusion with one or more elongate passages defined therethrough. While balloon 18 is used for ease of terminology, it is to be appreciated that any suitable inflatable element or inflatable member may be used and any suitable mechanism for inflating such inflatable element may be used.

The steering tube (also referred to herein as a puncture lumen) 24 comprises a tubular member that slides within and relative to the shaft 22. The steering tube/puncture lumen 24 may reside within a dedicated passage in shaft 22, for example. The tube 24 is preferably configured and arranged to exit the shaft 22 at the location of lateral or side exit port 21 and end at a location away from the shaft 22. The portion 24 of the steering tube/puncture lumen 24 shown is configured to take on a curved shape when not restrained by being held within shaft 22. Tube 24 thus exits the shaft 22 along a direction that is approximately perpendicular to the shaft 22 in this example, placing it into an alignment to permit it to guide a guidewire therethrough to puncture a tissue structure next to the catheter. The steering tube/puncture lumen 24 thus directs a guide wire perpendicularly away from the shaft 22 and into the tissue structure.

The guidewire lumen 12, side exit lumen 14, and balloon inflation point 16 together form a multi lumen shaft. The guidewire lumen 12 may also be used as a dye injection port, for example. The guidewire lumen 12 extends from hub 50 in this example (see FIG. 9) distally to the end point of tip 20. A guidewire 13 is illustrated as exiting the distal port of guidewire lumen 12. The guidewire lumen 12 may be a 0.039" ID lumen, for example, and the guidewire 13 may be, for example, a 0.035" guidewire, for example. Alternatively, the guidewire lumen 12 may be used with a 0.014" guidewire for use as contrast injection. In general, any suitably sized lumen may be provided to work with any suitably sized guidewire. The side exit lumen 14 may be sized for receiving a steering tube/puncture device 24 or a micro catheter, for example, that may be steerable.

The balloon inflation point 16 may comprise an open area in the main catheter. The balloon inflation point may comprise an inflation lumen. The location of the balloon inflation point 16 may be varied based on use of the balloon 18. In some embodiments, two balloon inflation points may be provided and one or more balloons may be provided. The inflatable members can be symmetric about the catheter shaft or may be asymmetrical, such as being configured to principally inflate along one side of the shaft 22.

The balloon 18, or inflatable element, may be provided at the balloon inflation point 16. As mentioned above, the balloon 18 may be concentric or eccentric and may be used for anchoring and/or for sealing dye injection. In some embodiments, and specifically for anchoring and wall apposition, an eccentric balloon 18 may be provided at a balloon inflation point 16 generally opposite the side exit port to provide a counteracting force against an opposing side of the lumen. In some embodiments, two balloons, a concentric balloon and an eccentric balloon can be provided. In such an embodiment, the concentric balloon may be provided at a proximal location and the eccentric balloon may be provided at a distal location, for example.

In various embodiments, the tip 20 may be an atraumatic soft tip formed from a compliant polymer. The tip 20 may be radiopaque or may have radiopaque components to assist in tracking. In one embodiment, the tip 20 comprises loaded radiopaque 35D Pebax.

The steering tube or puncture lumen 24 can extend radially outwardly from the device at a side exit port 21. A crossing wire 26, is shown exiting the puncture lumen 24. The side puncture lumen 24 may be sized for receipt of any suitable crossing wire. In one embodiment, the puncture lumen 24 is sized for receipt of a 0.014" guide wire, such as a guidewire described in U.S. patent application Ser. No. 17/148,170, filed Jan. 13, 2021, which is incorporated by reference in its entirety for all purposes. The steering tube or puncture lumen 24 preferably includes a region of enhanced visualization in its distal region and distal end to enhance visibility under one or more imaging modalities. For example, the steering tube 24 may be covered at least in part by a radiopaque material such as platinum or gold. In some embodiments, the distal region may have an uneven surface to enhance its signature under a further visualization modality. In general, the puncture lumen 24 may be configured for controlled advancement and retraction using the hub 50.

FIGS. 2a-2d illustrates a marker band 40, also referred to as a shaped marker band. The marker band is a radiopaque marker that indicates the relative rotational position of the centripetal accessor catheter so that the surgeon knows when the correct orientation of the guidewire has been obtained to enter the myocardium. As illustrated, the marker band has a surface defined by a cylindrical geometry. The marker band includes an elongate spine or "bridge" portion along its length, and a partial loop at each end having a "C" shaped cross section, wherein the elongate spine is joined at a midpoint of each "C" shaped section. The marker band 40 may be formed of any suitable radiopaque material. In one embodiment the marker band 40 is formed of platinum and iridium, and/or gold material. The marker band is more fully shown and described with reference to FIGS. 14a-17c.

Figure 2D:
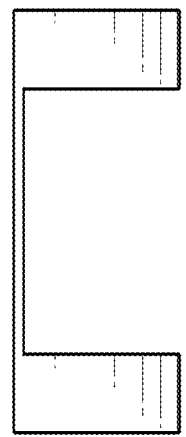
FIG. 2d illustrates a top view of the marker band of FIG. 2b.
Figure 2C:
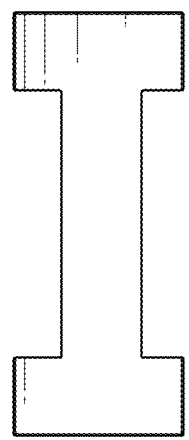
FIG. 2c illustrates a side view of the marker band of FIG. 2b.
Figure 2B:
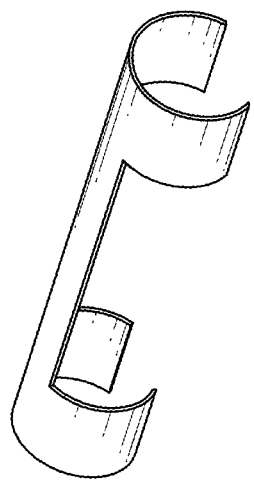
FIG. 2b illustrates a perspective view of a marker band, in accordance with the present disclosure.
Figure 3:
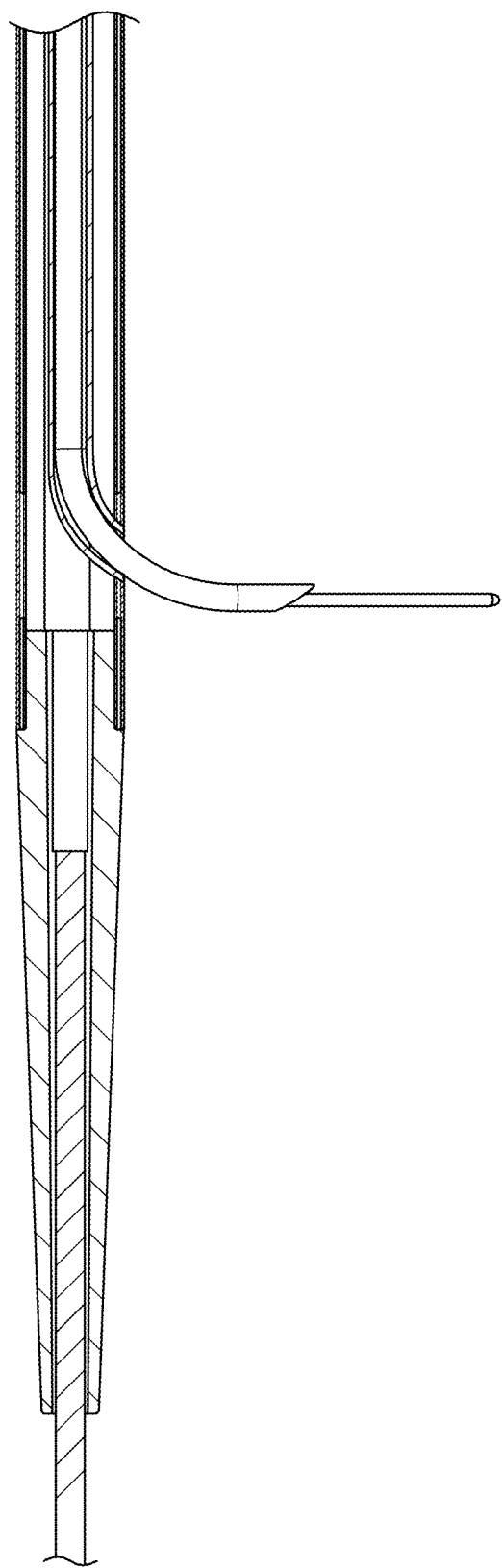
FIG. 3 illustrates a cross-sectional view of the distal portion of an access catheter, in accordance with one embodiment.

FIG. 2a illustrates the marker band 40 provided in the interior of an access catheter 10 and one or more brackets 44 defined by a "C" shaped cross section for engaging the main catheter shaft (see FIG. 3). View A is a top view and view B is a bottom view. FIG. 2b illustrates a perspective view of the shaped marker band 40. FIG. 2c illustrates a side view of the marker band 40. FIG. 2d illustrates a top view of the marker band 40. The marker band 40 may be used for locating the side exit port 21, and thus the side exit lumen 14, for intentional piercing or crossing of the myocardium. The marker band 40 thus includes an opening 42 for accommodating side exit lumen 14. The elongate spine that connects the two "C" segments, in use, is located at a location about the circumference of shaft 22 that is diametrically opposite from the opening or port 21 of the catheter. Opening or port of catheter 22 actually aligns with an open region 42 of the marker. The spine of the marker, in combination with the absence of material between the ends of the "C" shaped sections help a cardiologist or other user determine the rotational orientation and overall location of the exit port 21 under one or more imaging modalities. As such, a user can use the marker band 40 to help "aim" the exit port 21, and thus the steering tube 24, at a target location that is to be punctured or traversed by an electrosurgical guidewire that is guided through the steering tube 24.

The distal section of the access catheter 10, for example, the portion of the access catheter 10 distal of the balloon 18, may be flexible for increased trackability through a patient's vasculature. In various embodiments, the distal section may range from 55 D (10 cm) to 63 D (20 cm). The shaft may be 72 D, for example.

FIG. 3 illustrates a cross-sectional view of the distal portion of the access catheter 10. The guidewire lumen 12, side exit lumen 14, and balloon inflation point 16 together form a multi lumen shaft.

In general, the guidewire lumen 12 runs from a proximal end of the access catheter 10 to a distal end to the access catheter 10. The guidewire lumen 12 and the guidewire 13 may be provided with complementary sizing such that the guidewire 13 can extend through the guidewire lumen 12. For example, the guidewire lumen 12 may be a 0.039" ID lumen and the guidewire 13 may be a 0.035" guidewire. A 0.035" guidewire 13 may be used for tracking to the site. In some embodiments, the guidewire 13 may be exchanged for a second guidewire for use during the procedure. For example, a 0.035" guidewire 13 may be exchanged for a 0.014" guidewire during the procedure to define an annular space between the smaller guidewire and the lumen to provide a conduit for the passage of dye injection to use as contrast injection under one or more imaging modalities.

The soft tip 20 may comprise Pebax 35D, for example. A transition point 28 may be provided transitioning from the main shaft 22 to the atraumatic soft tip 20. In the embodiment shown, a side exit port 21 is provided just proximal of the transition point 28. The marker band 40 may be provided inside the main catheter shaft 22 at the point in the shaft where the side exit port 21 is located. The marker band may be used to assist a user to orient the access catheter and point the side exit port 21 to a desired location. One or more brackets 44 of the marker band 40 engage a surface, for example an interior surface, of the main catheter shaft 22. An opening 42 of the marker band 44 is positioned to accommodate the side exit lumen 14 and may be at least partially aligned with the side exit port 21. In some embodiments, the marker band 40 may be provided exterior of the main catheter shaft 22.

A side exit lumen 14 to receive steering tube 24 extends from the hub 50 (see FIG. 9) to the side exit port 21. A steering tube or puncture lumen 24 extends through the side exit lumen 14 and out of the main catheter shaft 22 at the side exit port 21. The puncture lumen 24 may be, for example, a nitinol tubular member with a radiopaque coating, such as a gold coating. The tubular member 24 can have a blunt end, or be provided with a sharpened end, if desired, to help the tubular member partially penetrate the tissue to be traversed to help better aim the guidewire that passes through tubular member 24. The steering tube or puncture lumen 24 may be advanced or retracted by a user using the hub 50. As illustrated, the steering tube may have a bevel cut point on an inner side thereof to aid in tracking and to substantially avoid cutting into the distal edge of the side exit port 21. A crossing guidewire 26 may travel through and exit the puncture lumen 24.

FIG. 4 is a table illustrating exemplary dimensions for parts of the access catheter 10. It is to be appreciated that these dimensions are intended to be exemplary only and are not intended to be limiting. The main shaft 22 may have an inner dimeter of 0.092", an outer diameter of 0.108", and a usable length of 105 cm. The guidewire lumen may have an inner diameter of 0.039" and an outer diameter of 0.047". The steering tube or puncture lumen 24 may have an inner diameter of 0.039" and an outer diameter of 0.047". The balloon may have a length of approximately 2 cm, a diameter of approximately 10-15 mm, and a usable length of approximately 15 mm. The puncture lumen may have an inner diameter of 0.018", an outer diameter of 0.031" (with outer support) and a usable length of approximately 115 cm.

Figure 6:
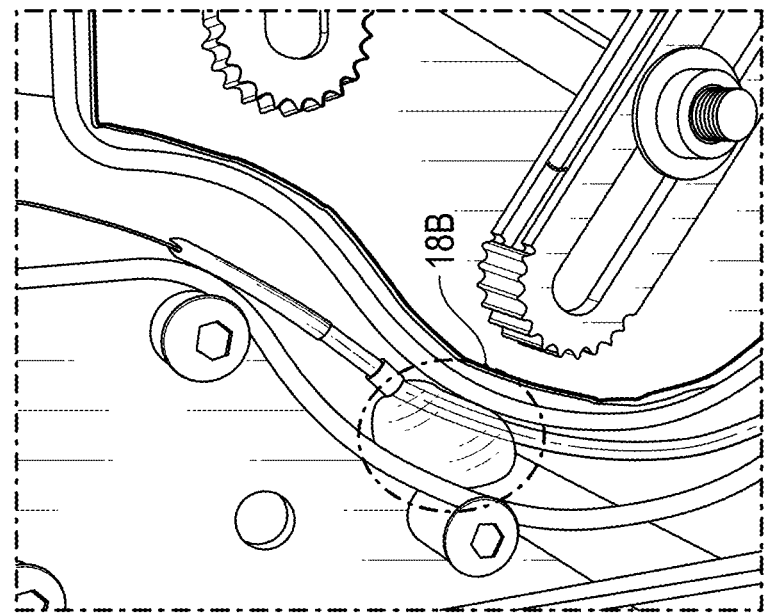
FIG. 6 illustrates an access device with an eccentric balloon, in accordance with one embodiment.
Figure 5:
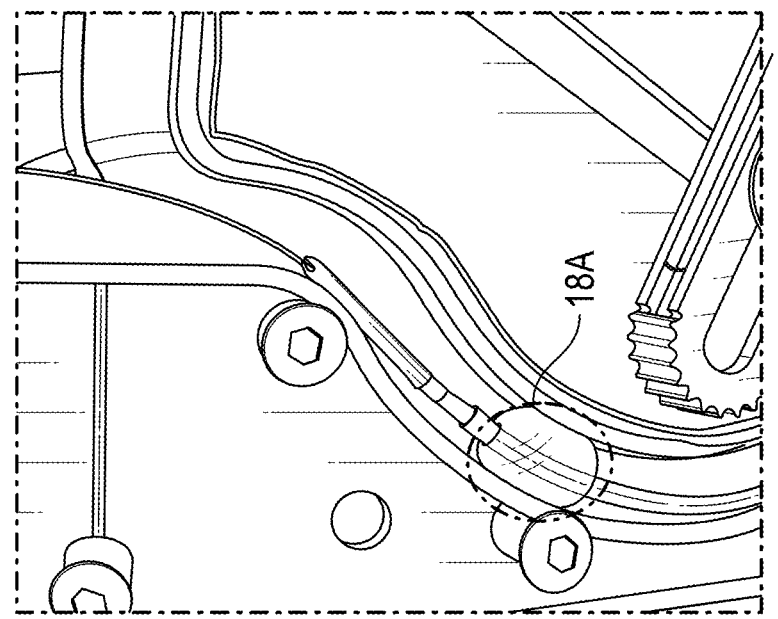
FIG. 5 illustrates an access device with a concentric balloon, in accordance with one embodiment.

FIGS. 5 and 6 illustrate example balloon types for use with the access device. While these figures specifically illustrate balloons, any suitable inflatable element may be used. Each of FIGS. 5 and 6 illustrate the balloon in a distal position. Both or either of the balloons may alternatively be provided in a proximal position.

FIG. 5 illustrates a concentric balloon 18a. Upon inflation, the concentric balloon 18a generally centers the catheter in the vessel. The concentric balloon 18a thus may be used to center the catheter and seal the vessel. Alternatively, several balloons can be provided about the circumferential extend of the catheter 24 to permit perfusion to occur along the catheter. In general, a concentric balloon may be positioned proximally on the first distal segment to seal the coronary sinus for the ability to do contrast injections to visualize the coronary sinus and the distal perforator veins. This enables the operator to determine where to cross the myocardium for completing a cerclage loop.

FIG. 6 illustrates an eccentric balloon 18b. Upon inflation, the eccentric balloon apposes the catheter against a wall of the vessel. The eccentric balloon 18b thus may be used to press the accessor device side wall against the vessel wall and seal the vessel. The eccentric balloon provides a counteracting force against the puncture lumen. The eccentric balloon may be positioned distally, generally just behind and opposite the side exit port to help anchor the distal area of the access catheter, pressing the side exit port against the myocardium for easier, deeper penetration of the puncture lumen.

FIGS. 7a, 7b, 8a, and 8b illustrate exemplary proximal and distal balloon location positions. FIGS. 7a and 7b illustrate embodiments of a distal position, which may be useful for an eccentric balloon such as shown in FIG. 6.

FIGS. 8a and 8b illustrate embodiments of a proximal position, which may be useful for a concentric balloon such as shown in FIG. 5. FIGS. 7b and 8b illustrate the puncture lumen 24 deployed out of the side exit lumen 14. In some embodiments, the catheter is provided with a balloon at each of the proximal and distal balloon locations. For example, the access device may be provided with a concentric balloon at a proximal location and an eccentric balloon at a distal location.

FIG. 9 illustrates an assembled access device 5 with a hub 50 coupled to the access catheter 10. FIG. 10a illustrates a close up of the hub 50, in accordance with one embodiment. The hub may be ergonomically designed to fit comfortably in the hand of a user. The hub 50 includes a main body 52 and a puncture element 54. The main body 50 includes a balloon inflation port 56, a flush port 58, a flush port or dye inflation port 60, and a central guidewire lumen 62. The puncture element 54 has a handle 76 and receives a puncture element (75 of FIG. 12), with the puncture element hub 64 extending therefrom. The balloon inflation port 56 may be configured to utilize space around the two inner lumens to inflate the balloon. The central guidewire lumen may be 0.035" compatible or may be a dye injection lumen with a 0.014" guidewire in place after exchanging out the 0.035" guidewire, for example.

Figure 10B:
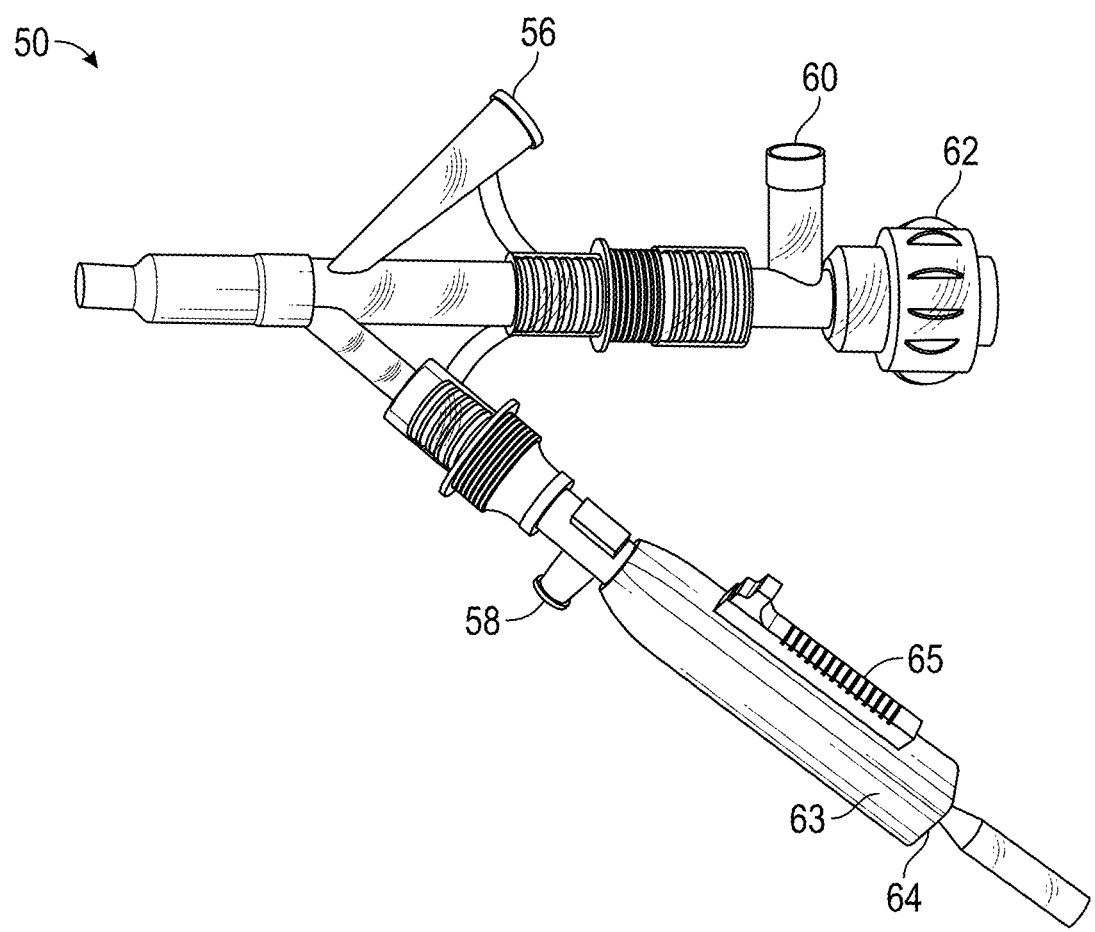
FIG. 10b illustrates an alternative embodiment of a hub.

FIG. 10b illustrates an alternative embodiment of the hub 50. The hub includes a balloon inflation portion 56, a flush port 58, a flush or dye injection port 60, a guidewire lumen 62, and a body 63 including an actuator 65. The puncture element hub 64 is shown extending from the body 63. The balloon inflation portion 56 utilizes space around the two inner lumens to inflate the balloon. The guidewire lumen 62 may be 0.035" compatible. Alternatively, the guidewire lumen 62 may be a dye injection lumen with a 0.014" guidewire in place. In one embodiment, the actuator 65 is a slide button. The actuator 65 may be used to advance or retract the puncture element. The actuator 65 maintains the pokier element in a straight position at exit and allows for controlled puncture. The body 63 may be removed to insert a microcatheter into the side exit lumen.

Figure 11A:
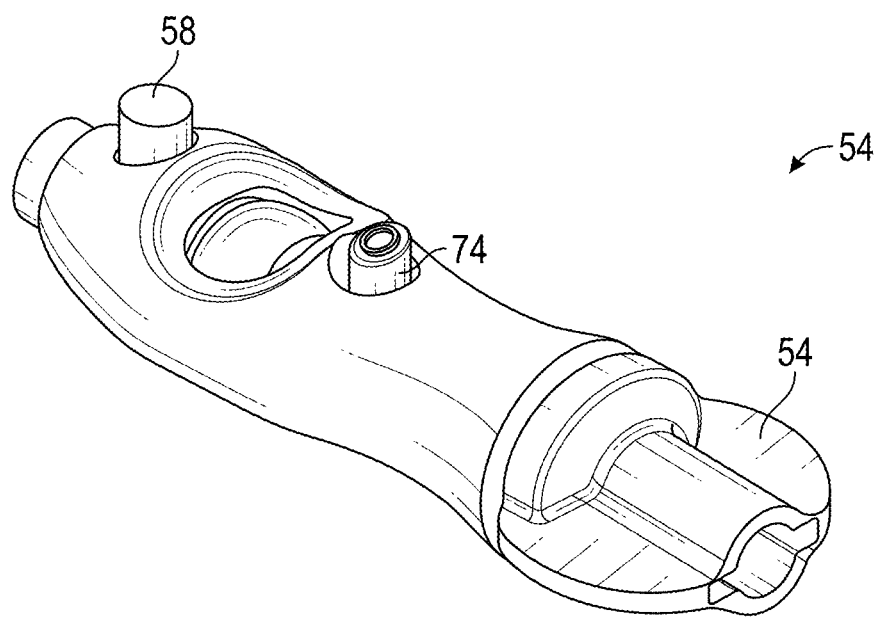
FIG. 11a illustrates a perspective view of a main body and a puncture element of a hub, in accordance with one embodiment.
Figure 11B:
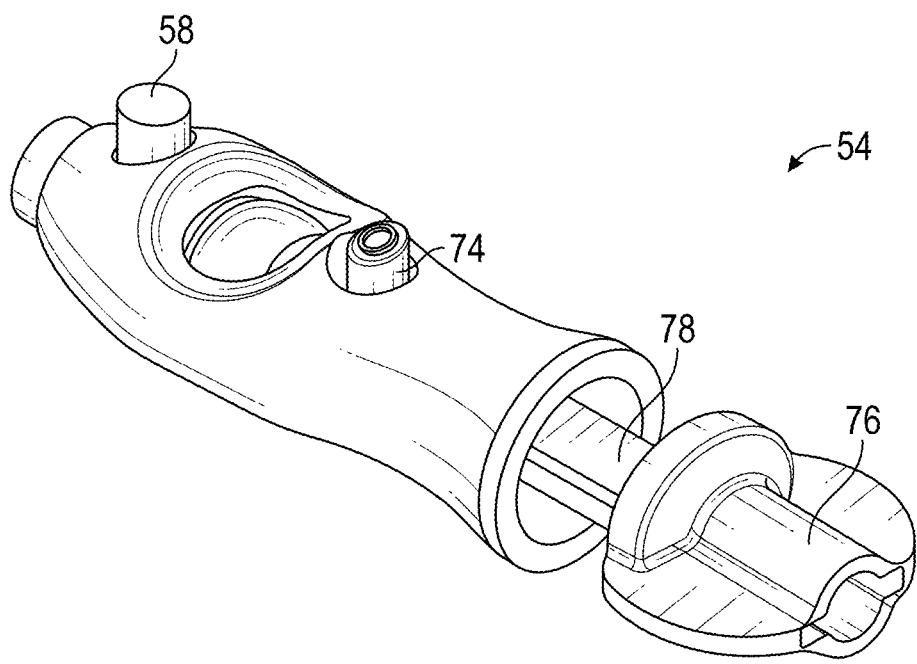
FIG. 11b illustrates a perspective view of a main body and a puncture element of a hub, in accordance with one embodiment.
Figure 11C:
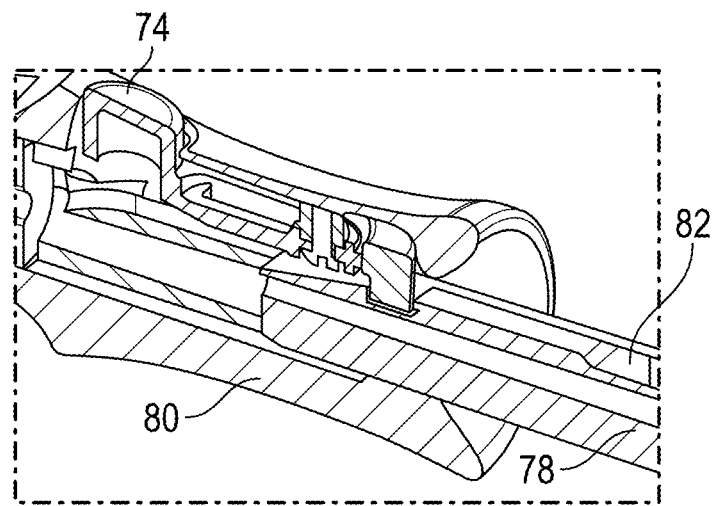
FIG. 11c illustrates a partial cross-sectional view of a main body and a puncture element of a hub, in accordance with one embodiment.
Figure 11D:
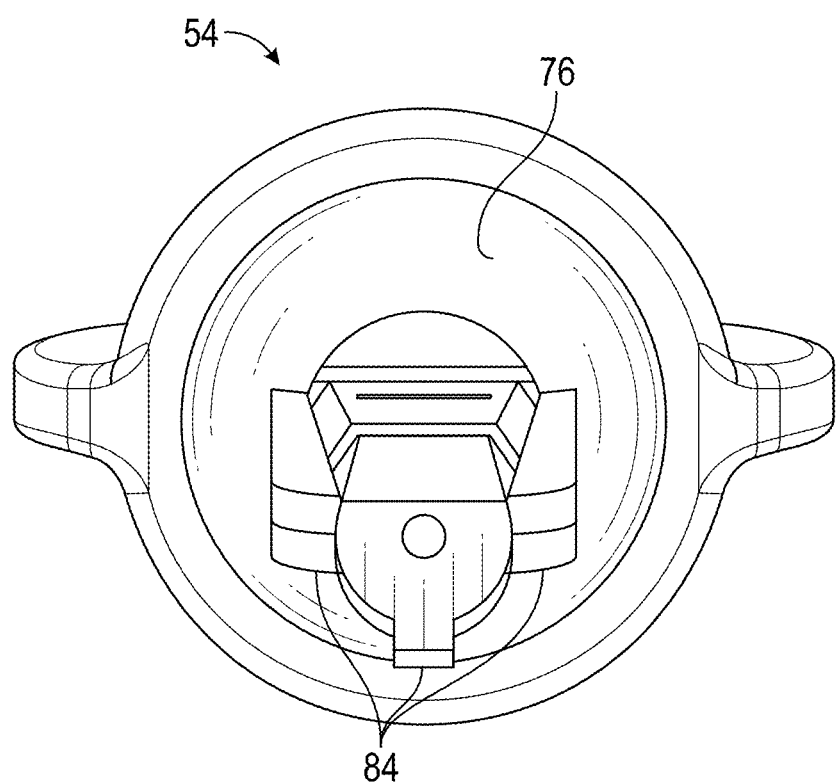
FIG. 11d illustrates an end view of a puncture element, in accordance with one embodiment.

FIGS. 11a-11d illustrate the main body 52 and puncture element 54 of the hub 50, in accordance with one embodiment. FIGS. 11a and 11b illustrate perspective views of the main body 52 and puncture element 54 of the hub 50. FIG. 11c illustrates a partial cross sectional view of the main body 52 and puncture element 54 of the hub 50. FIG. 11d illustrates an end view of the puncture element 54. The main body 52 can include an actuator 74 that may be used to release or lift a proximal lever from a holding groove or indentation. The puncture element 54 includes a puncture or push pull handle element 76, an extension piece 78, and a shaft 86 (see FIG. 12). In some embodiments, the puncture element 54 may be removed to insert a microcatheter into the side exit lumen of the main catheter.

As shown in FIGS. 11c and 11d, the puncture element 54 may include ribs 84 and grooves 80, 82. The ribs 84 are configured to keep the puncture element 54 straight within the main body 52. The extension piece 78 includes a holding groove 80 for holding the extension piece 78 in an advanced position and/or a retracted position. The extension piece 78 further includes an advanced position groove 82. The handle element 76 facilitates controlled puncture.

In some embodiments, the handle element 76 may be threaded to allow delivery and retraction with increased precision. More specifically a threaded handle grip may be provided as an advancing and retracting mechanism to improve incremental accuracy of the motion of the puncture element.

Figure 12:
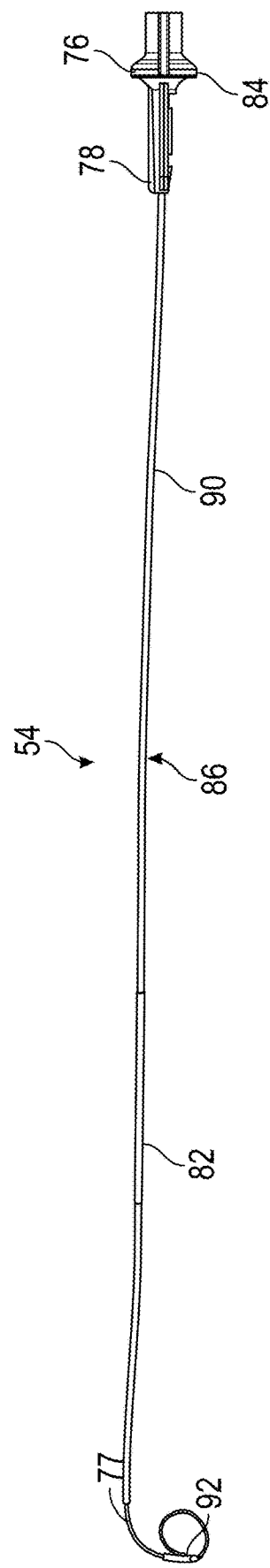
FIG. 12 illustrates a puncture element, in accordance with one embodiment.

FIG. 12 illustrates the puncture element 75. As previously discussed, the puncture element 75 includes a handle element 76, an extension piece 78, and a shaft 86. The shaft may terminate in a curved portion 77 with distal tip 92. The distal tip 92 correlates to the portion of the puncture lumen shown at 24 (for example in FIG. 1). The distal tip 92 may have a bevel cut for ease of tissue puncture. The bevel cut may be on the inside of the curve to reduce or eliminate any possibility of the tip 92 digging into the side exit wall. In the embodiment shown, a distal portion 88 of the shaft has a coating, such as a PTFE heat shrink coating, to increase lubricity for tracking through a tortuous vessel and to poke and retract without additional friction. Such distal portion 88 may be, for example the distal 30 cm of the shaft 86. The PTFE shrink coat may have, for example, a 0.004" recovered wall thickness with an expanded inner diameter of 0.030" and a recovered inner diameter of 0.010". The remainder of the shaft 86 may have an added layer, such as a stainless steel or nitinol hypo-tube, to increase push-ability of the shaft when poking through the septum. A suitable nitinol hypo-tube may, for example have a 0.002" wall thickness (0.0175"×0.0225"). A suitable support hypo-tube formed from stainless steel may have, for example, a 0.005" nominal wall thickness over approximately 100 cm length (0.025"× 0.023"). The distal tip 92 may have a coating, such as a gold coating, for improved visibility under fluoroscopy when advancing or retracting the shaft 86. The gold coating may be on approximately the last inch of the shaft 86 and may have a thickness of approximately 0.001".

Figure 13A:
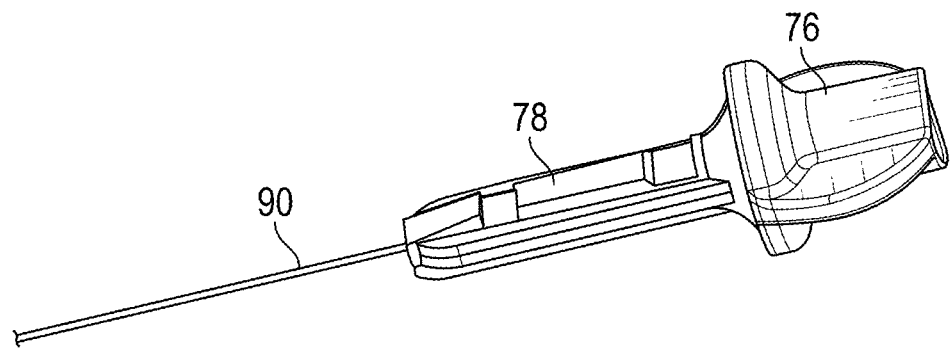
FIG. 13a illustrates a handle element and extension piece of a puncture element, in accordance with one embodiment.
Figure 13B:
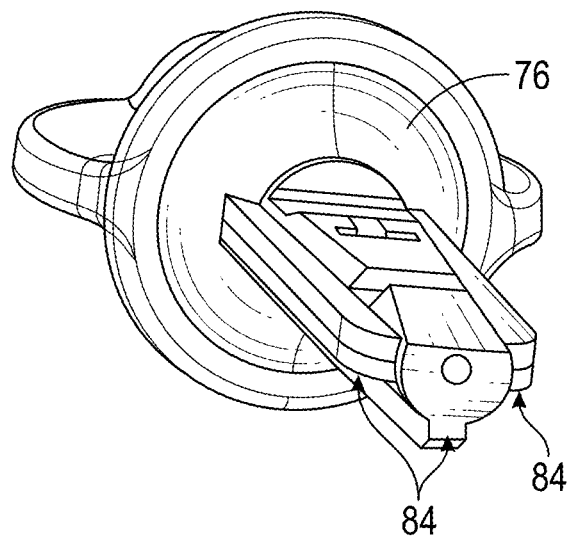
FIG. 13b illustrates a handle element and extension piece of a puncture element, in accordance with one embodiment.
Figure 14A:
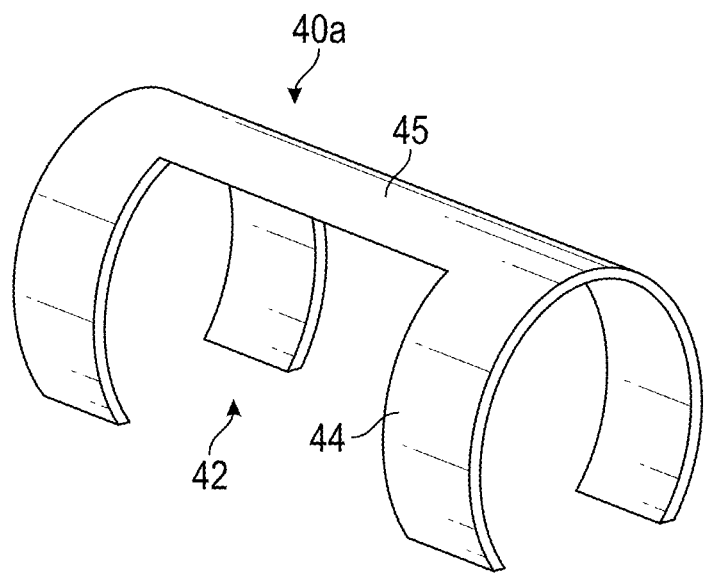
FIG. 14a illustrates a perspective view of a marker band, in accordance with a first embodiment.
Figure 14B:
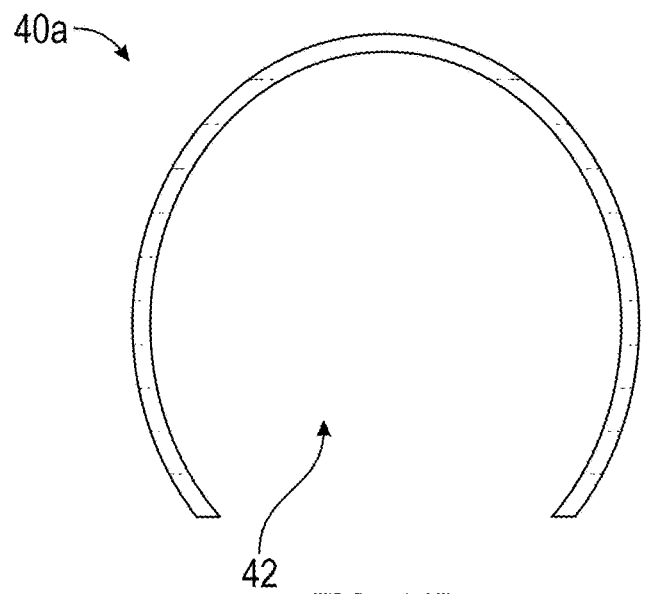
Figure 14C:
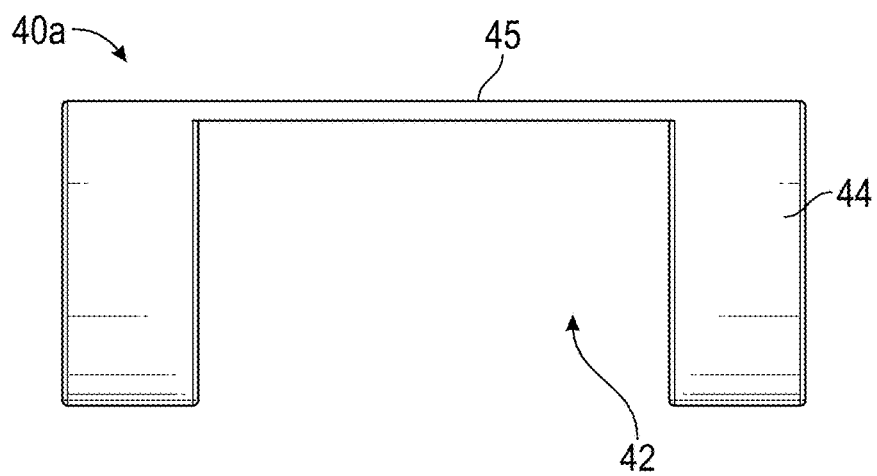
Figure 14D:
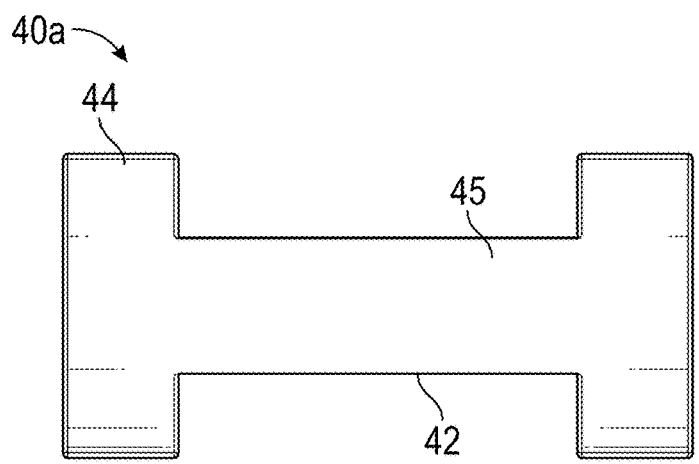

FIGS. 13a and 13b illustrate alternative views of the handle element 76 and extension piece 76 of the puncture element. The proximal portion of the shaft 86 may have a hypo-tube, such as a stainless steel hypo-tube, provided thereover. The hypo-tube may be inserted/bonded into the handle extension piece 76. Rails 84 may be provided for maintaining the straightness of the puncture lumen when advancing or retracting.

As discussed with reference to FIGS. 2a-2d, a marker band 40 may be provided to assist in locating the side exit lumen for intentional piercing or crossing of the myocardium. In general, the marker band includes a surface for engaging the catheter shaft and an opening for accommodating a puncture lumen. The structure of the marker band is such that it appears differently at different orientations under a visualization or imaging modality. More specifically the structure of the marking band may be such that it permits a user to detect the marker bands rotational orientation. For example, with reference back to FIG. 2a, view B illustrates the top bar or connector of the marker band and view A illustrates the bottom opening of the marker band.

FIGS. 14a-14d, 15a-15c, 16a-16c, and 17a-17c illustrate various embodiments of a marker band. The marker band may engage the interior of the main catheter shaft or the exterior of the main catheter shaft. It is to be appreciated that these are exemplary embodiments only and other embodiments of a marker band may be used. In general, the marker band may comprise platinum (90%) and iridium (10%) or other suitable material that can be viewed under ultrasound or other imaging techniques. In general, a wall of the marker band may be approximately 0.004" thick. The arrow shown in the figures indicates the direction of the puncture lumen exit.

FIGS. 14a-14d illustrate a perspective view, an end view, a side view, and a top view of a first embodiment of a marker band 40a. This configuration gives the operator three different views for orienting the side exit port. This can give the operator more confidence in choosing the proper direction to choose the septum and helps eliminate the need for multiple crossing attempts. The marker band 40a includes an opening 42 for accommodating the puncture element 24. One or more brackets 44 are provided for engaging the main catheter shaft. The brackets 44 may at least partially bracket the opening 42. A connector 45 extends between the brackets 44. In this embodiment, the connector 45 is a rectangular extension between the brackets 44. The connector 45 and brackets 44 may comprise a unitary structure. In this embodiment, the brackets 44 are open at the bottom such that the opening 42 is provided along an entire surface of the catheter when the marker band 40a is positioned therein or thereon.

Figure 15A:
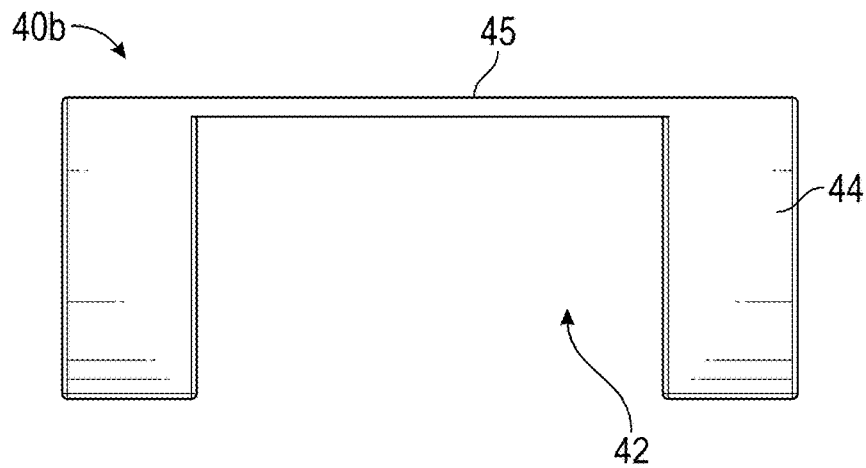
FIG. 15a illustrates a side view of a marker band, in accordance with a second embodiment.
Figure 15B:
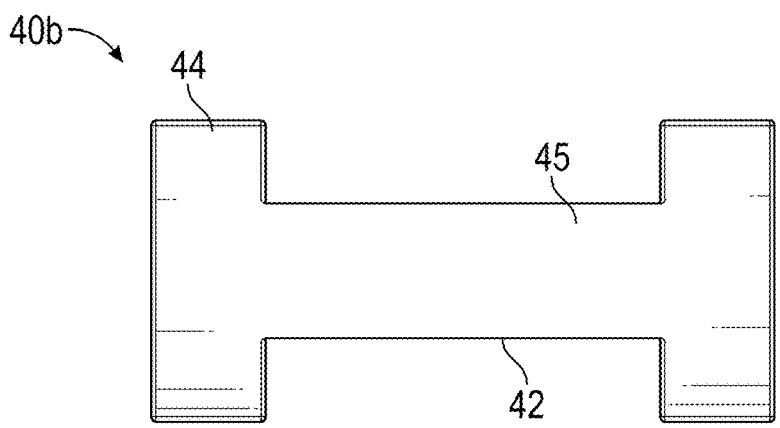
Figure 15C:
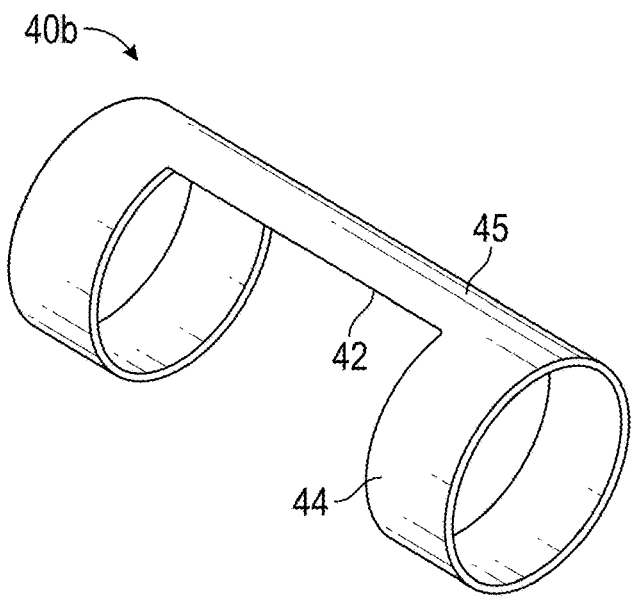

FIGS. 15a-15c illustrate a side view, a top view, and a perspective view of a second embodiment of a marker band 40b. This configuration gives the operator two different views for orienting the side exit port. The marker band 40b includes an opening 42 for accommodating the puncture element 24. One or more brackets 44 are provided for engaging the main catheter shaft. The brackets 44 may at least partially bracket the opening 42. A connector 45 extends between the brackets 44. The connector 45 and brackets 44 may comprise a unitary structure. In this embodiment, the brackets 44 are rings such that the opening 42 is bracketed by the bracketed along an entire circumference.

Figure 16A:
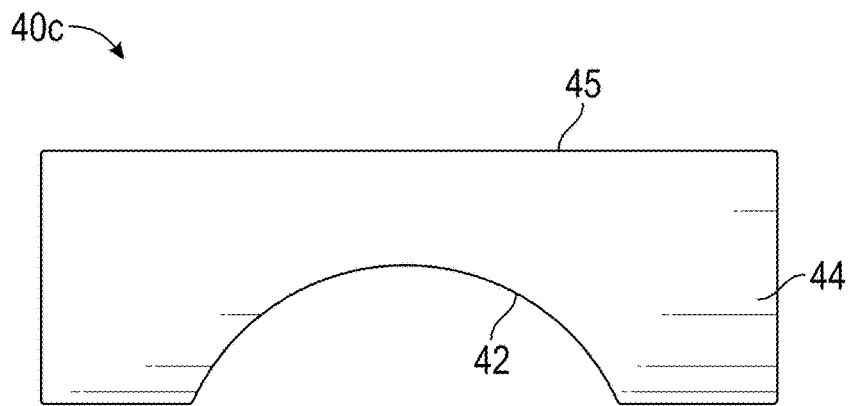
FIG. 16a illustrates a side view of a marker band, in accordance with a third embodiment.
Figure 16B:
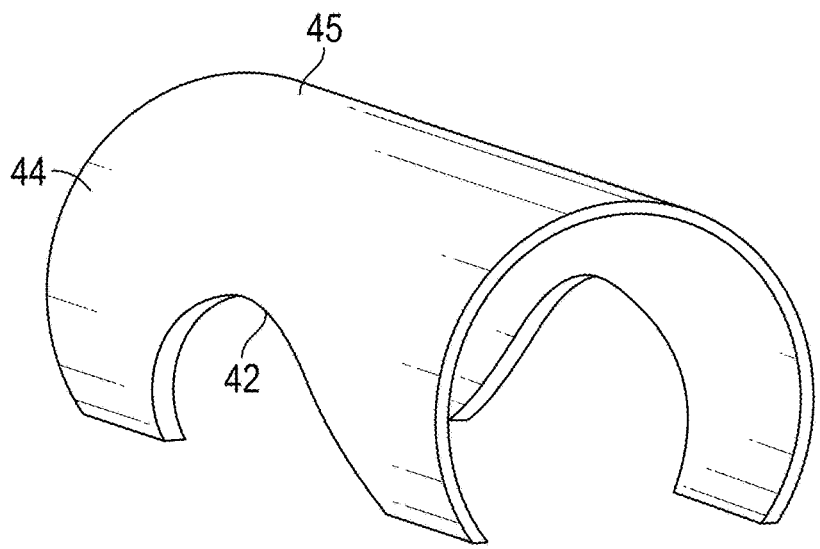
Figure 16C:
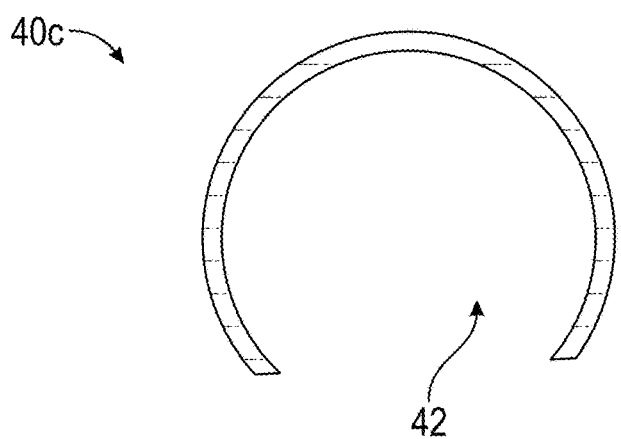

FIGS. 16a-16c illustrate a side view, a perspective view, and an end view of a second embodiment of a marker band 40c. This configuration gives the operator two different views for orienting the side exit port. The marker band 40c includes an opening 42 for accommodating the puncture element 24. One or more brackets 44 are provided for engaging the main catheter shaft. The brackets 44 may at least partially bracket the opening 42. A connector 45 extends between the brackets 44. The connector 45 and brackets 44 may comprise a unitary structure. In the embodiment of FIGS. 16a-16c, the marker band comprises a sleeve with the opening 42 cut out and forming the brackets 44. The brackets 44 of the sleeve are open at the bottom such that the opening 42 is provided along an entire surface of the catheter when the marker band 40c is positioned therein or thereon.

Figure 17A:
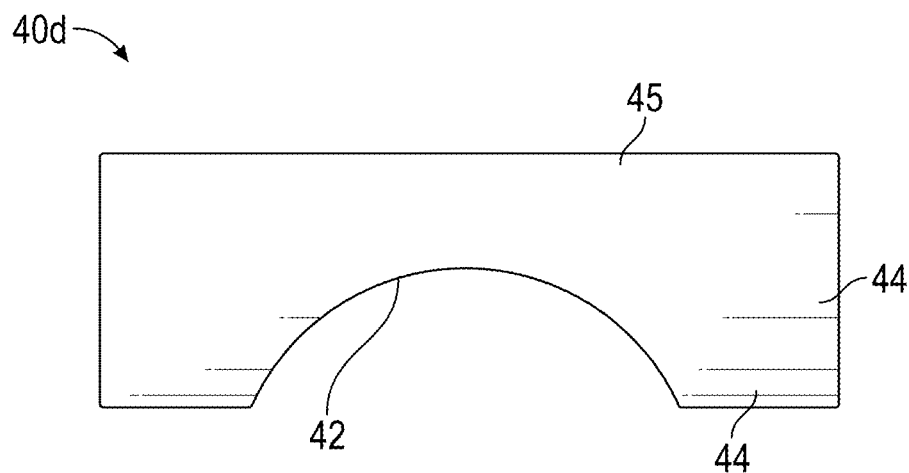
FIG. 17a illustrates a side view of a marker band, in accordance with a fourth embodiment.
Figure 17B:
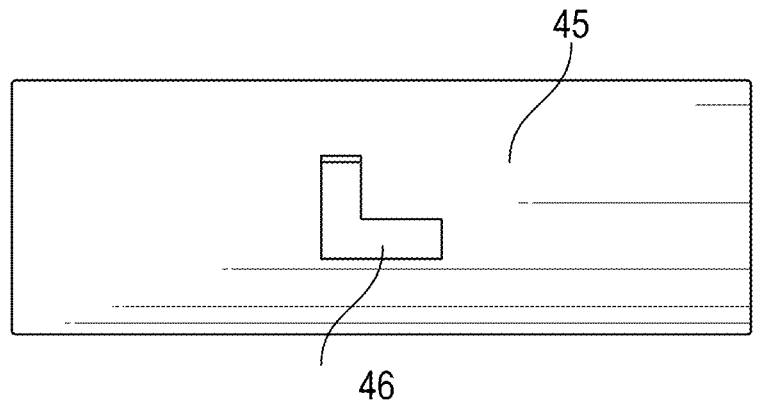
Figure 17C:
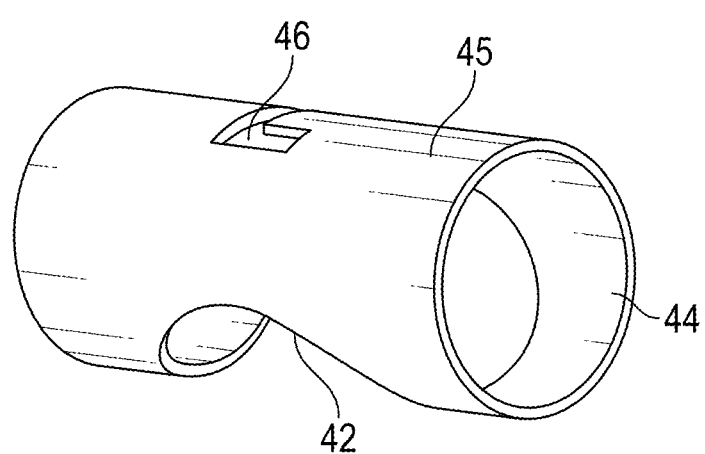

FIGS. 17a-17c illustrate a side view, a top view, and a perspective view of a second embodiment of a marker band 40d. This configuration gives the operator two different views for orienting the side exit port. The marker band 40d includes an opening 42 for accommodating the puncture element 24. One or more brackets 44 are provided for engaging the inside of a main catheter shaft. The brackets 44 may at least partially bracket the opening 42. A connector 45 extends between the brackets 44. A cut out 46 is provided along the connector 45. The cut out 46 provides a visual indication of orientation. In the embodiment of FIGS. 17a-17c, the marker band comprises a sleeve with the opening 42 and cut out 46 cut out of the sleeve. The cut out opening 42 forms the brackets 44. In this embodiment, the brackets 44 of the sleeve are rings such that the opening 42 is bracketed by the bracketed along an entire circumference.

Figure 18A:
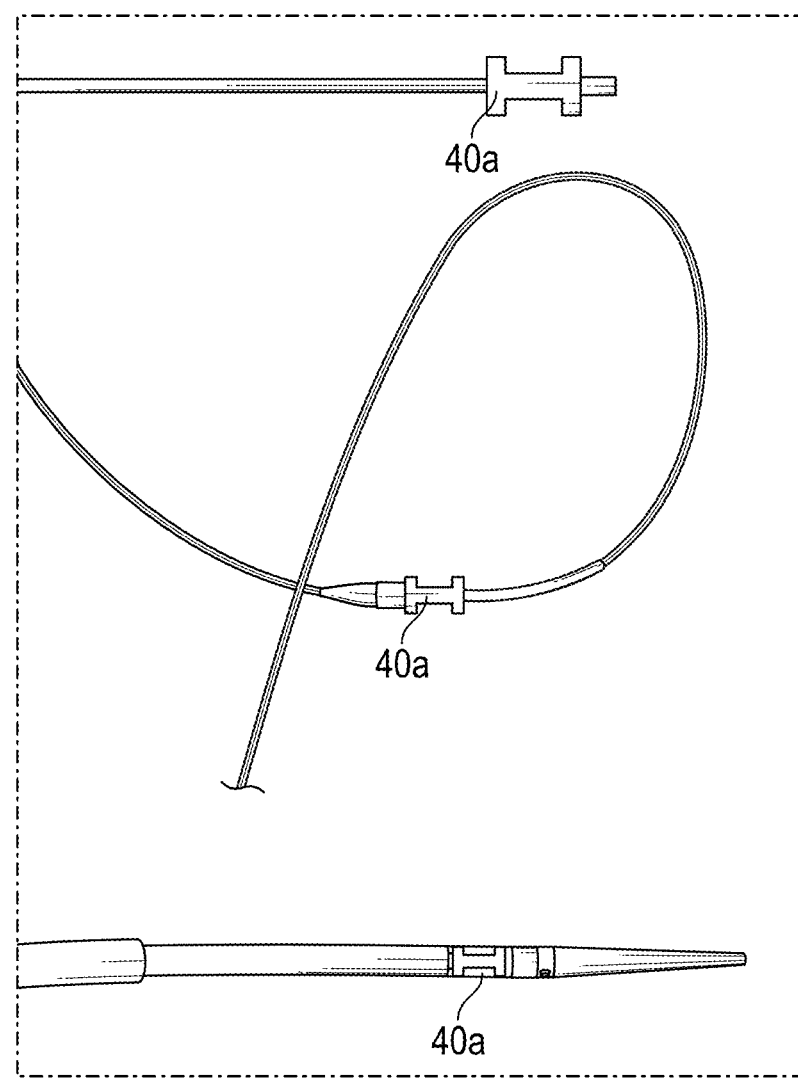
FIG. 18a illustrates a top view of the marker band of FIG. 14a in use.
Figure 18B:
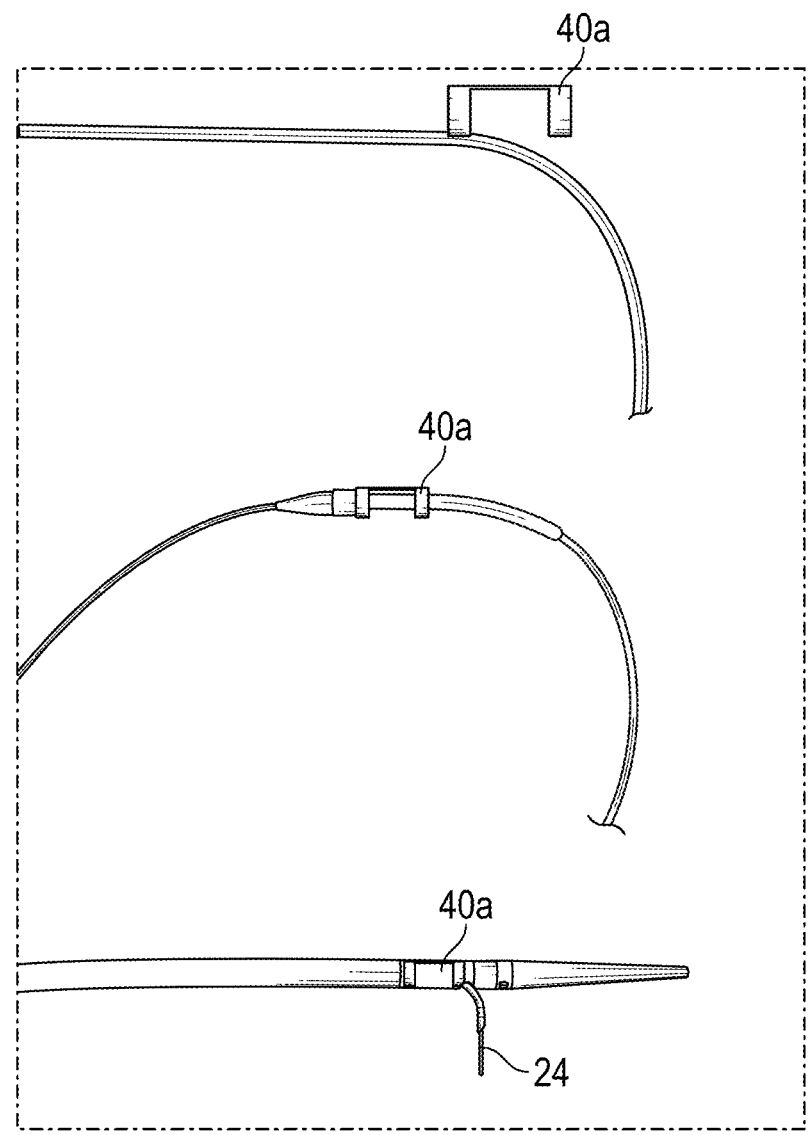
FIG. 18b illustrates a side view of the marker band of FIG. 14a in use.
Figure 18C:
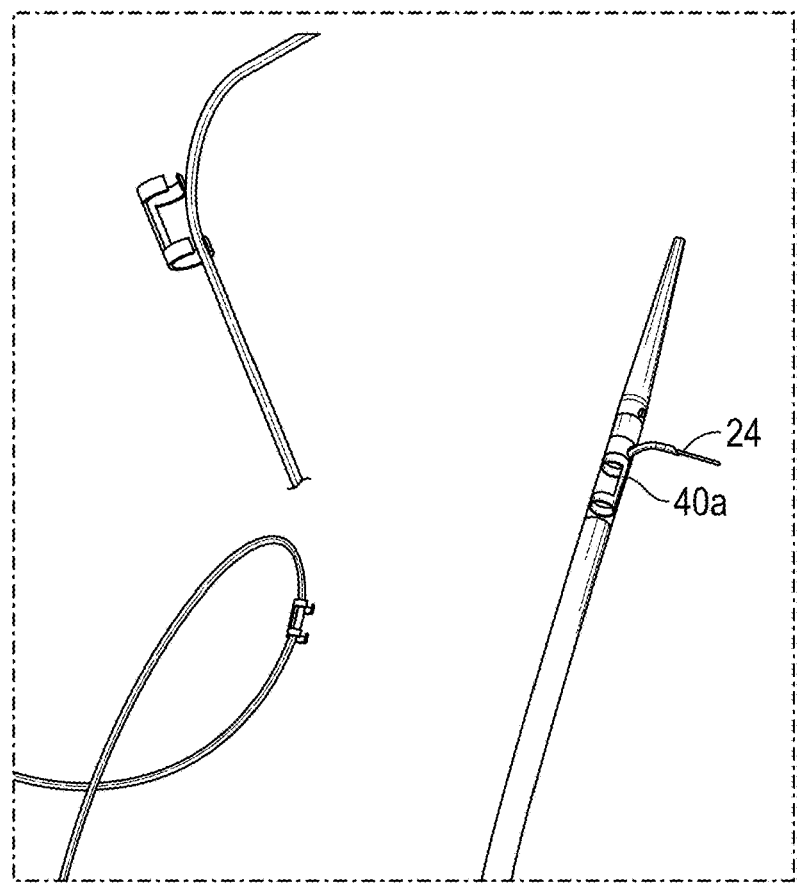
FIG. 18c illustrates an isometric view of the marker band of FIG. 14a in use.
Figure 18D:
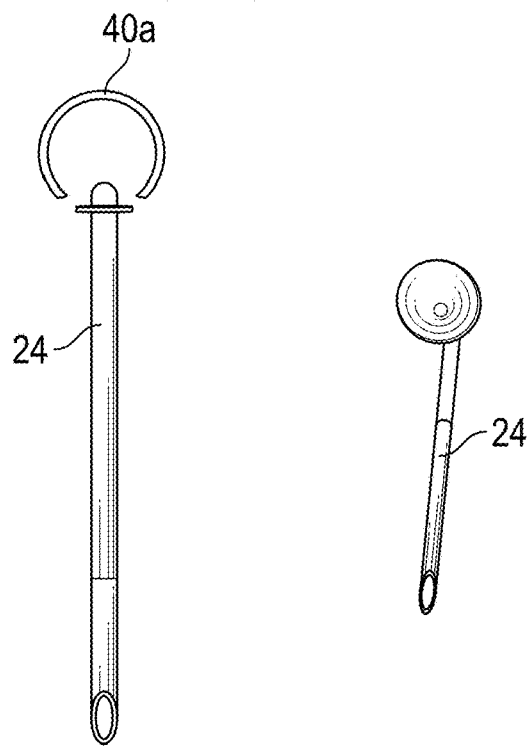
FIG. 18d illustrates a top view of the marker band of FIG. 14a in use.

FIGS. 18a-18d illustrate the marker band 40a of FIGS. 14a-14d in use. FIG. 18a illustrates a top view. FIG. 18b illustrates a side view. FIG. 18c illustrates an isometric view. FIG. 18d illustrates an end view. Each of 18a, 18b, and 18c includes an illustration, an ultrasound view, and a picture. FIG. 18d includes an illustration and a picture. It is to be appreciated that in the pictures, in this embodiment, the marker band is interior of the catheter. These illustrate how the marker band may be viewed in different projections to better ensure the direction of puncture prior to advancing the puncture lumen out of the side exit port. The puncture element 24 is shown in FIGS. 18*b*-18*d*.

Figure 19:
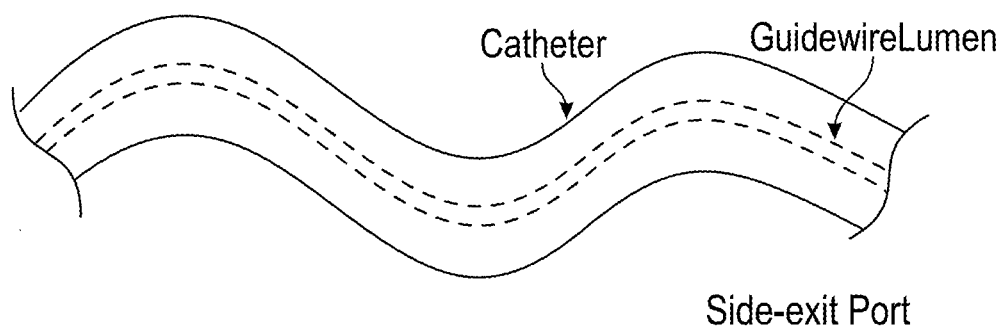
FIG. 19 illustrates an access device as deployed through a vessel such as a coronary vessel, in accordance with one embodiment.
Figure 20A:
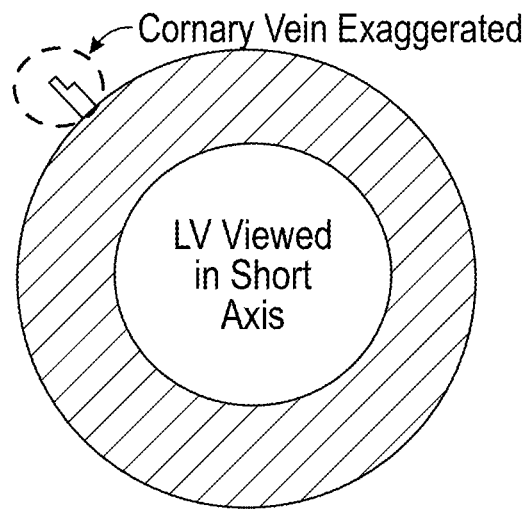
FIG. 20a illustrates an end view of the orientation of a centripetal catheter with respect to the left ventricle, in accordance with one embodiment.
Figure 20B:
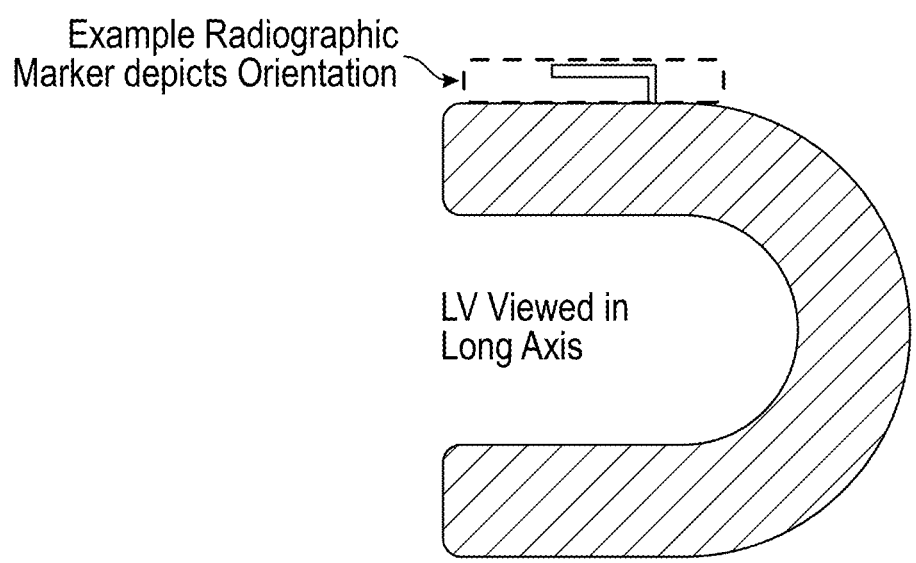
FIG. 20b illustrates a side view of the catheter with the left ventricle viewed in the long axis, in accordance with one embodiment.
Figure 21:
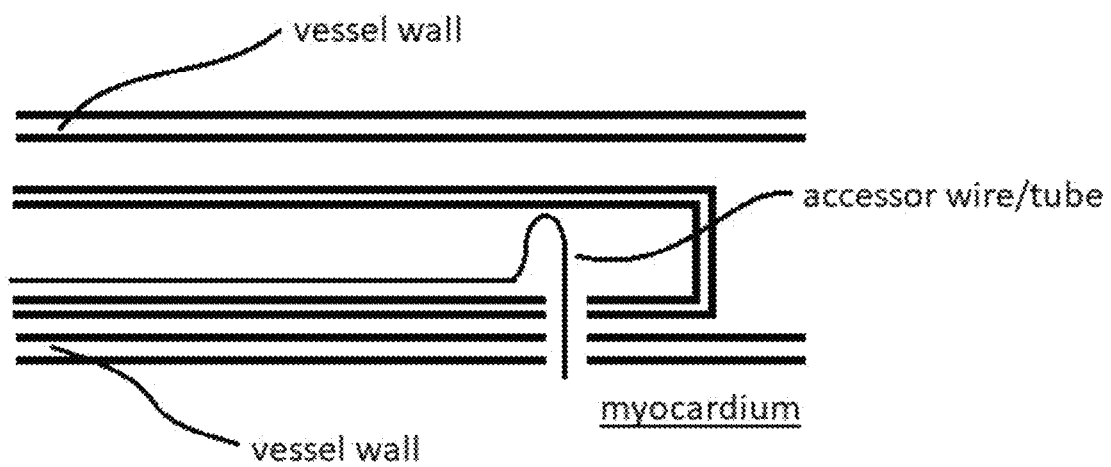
FIG. 21 illustrates a sketch of a guidewire path following a switchback path that directs it into the myocardium, in accordance with one embodiment.
Figure 22A:
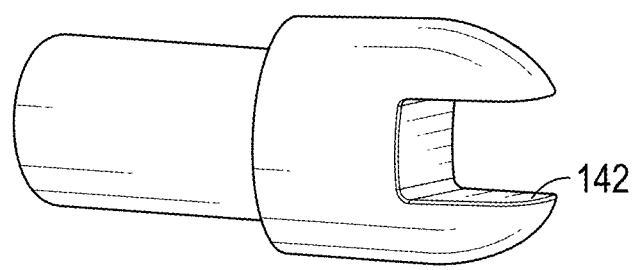
FIGS. 22A-23D depict a further example of an access catheter in accordance with the disclosure, or aspects thereof.
Figure 22B:
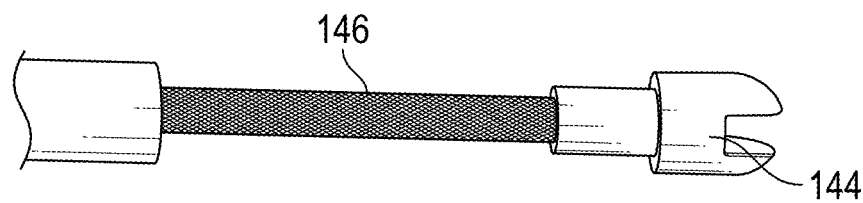
Figure 22C:
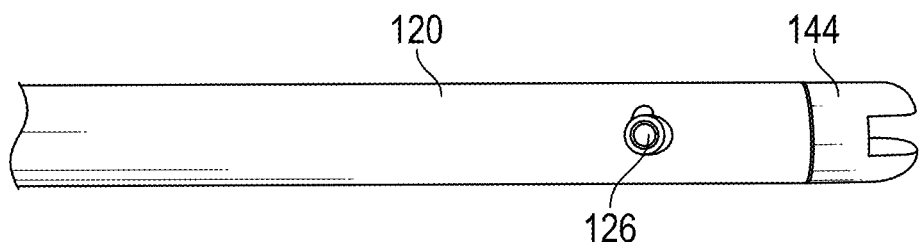
Figure 22D:
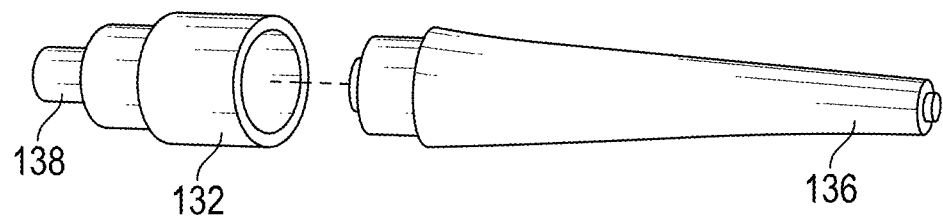
Figure 22E:
Figure 22F:
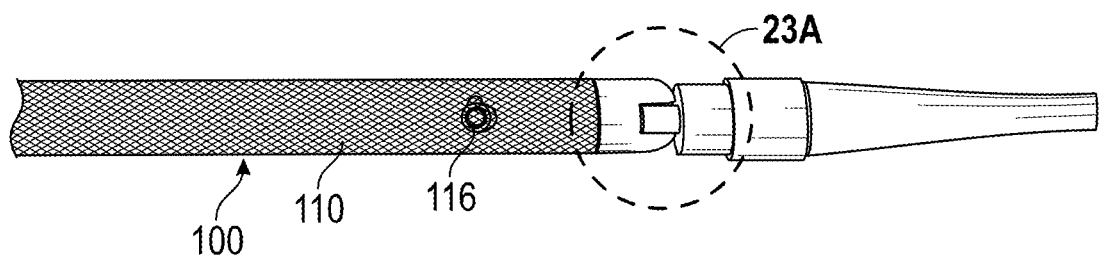

FIG. 19 illustrates an access device as deployed through a vessel such as a coronary vessel. FIG. 20*a* illustrates an end view of the orientation of a centripetal catheter with respect to the left ventricle. FIG. 20*b* illustrates a side view of the catheter with the left ventricle viewed in the long axis. FIG. 21 illustrates a sketch of a guidewire path following a switchback path that directs it into the myocardium.

FIGS. 22A-23D depict a further example of an access catheter 100 in accordance with the disclosure, or aspects thereof. As depicted, catheter 100 is similar in concept to catheter 10, but uses a three shaft construction to accomplish its aim. An intermediate catheter tubular component is formed from a sleeve 120 that slidably and removably fits over an inner catheter. The inner catheter is formed from an inner shaft 146 that is coupled to a keyed distal end portion 142 that defines a keyed distally facing element, or tip 144, that is slidably received by a male component 138 of the tip structure depicted in FIG. 22D. As illustrated, the end portion 142 includes a proximal section of reduced diameter to be removably received by the open distal end of sleeve 120, and a larger diameter distal end portion that includes a cylindrical surface that terminates in a hemispherical distal portion that is intersected by a transverse notch that receives component 138.

Figure 23A:
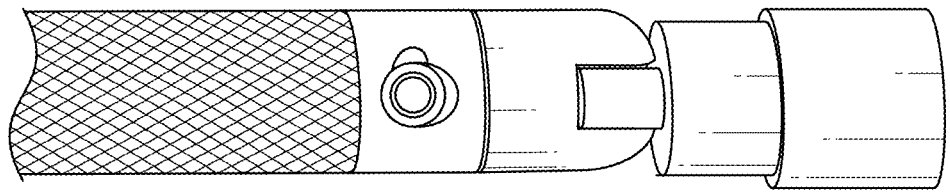
Figure 23B:
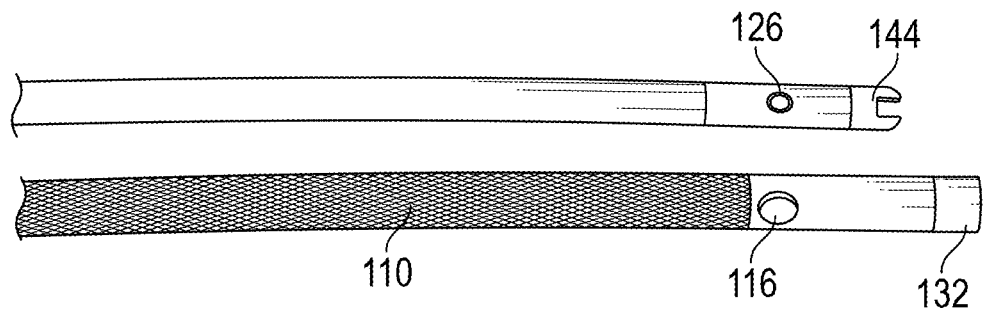
Figure 23C:
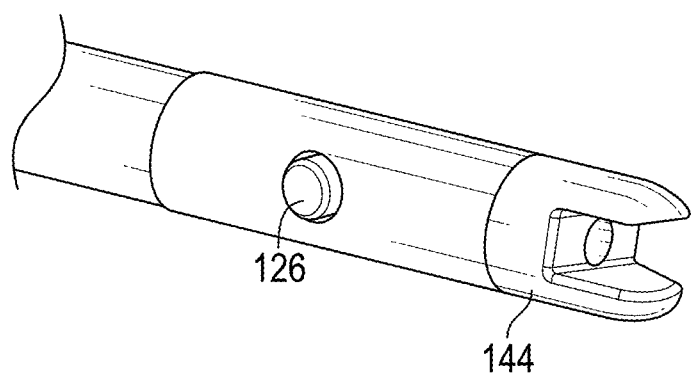
Figure 23D:
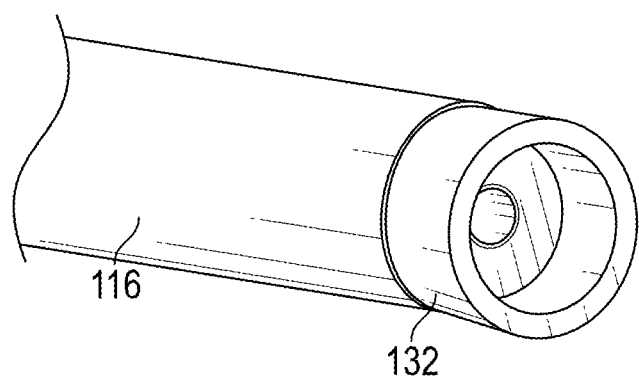

When interlocked, the inner and outer catheters are aligned and can rotate as a single unit. The tubular member 120 houses a lumen therein to slidably receive the poker tube or puncture element 24 that slides out of exit port 126. When the poker tube 24 is no longer being used to access tissue, the poker can be withdrawn into tube 120 leaving a crossing guidewire in place in the anatomy in the laterally defined tissue passage, and tube 120 can be removed with the poker leaving inner member 146/142 in place within the outer catheter that is formed from tubular member 110 (which may be braided as desired) coupled to the tip structure formed from elements 138/132 and 136. As with embodiment 10, the tip defines a guidewire lumen therethrough. Port 126 within tubular member 120 is aligned with port 116 in the outer tubular member to permit the poker to be deployed laterally outwardly from the catheter and into adjacent tissue. FIG. 23A shows the outer tubular member 110 with member 120 slidably received within it with the exit ports 126, 116 aligned. FIG. 23B shows the inner and outer tubular members side by side. FIG. 23C shows an up close view of the distal end region of the intermediate tube and innermost catheter in an assembled configuration, and FIG. 23D shows the outer catheter prior to installation of the atraumatic distal tip portion.

Figure 24A:
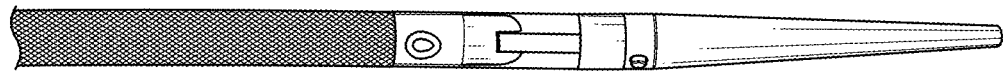
FIGS. 24A-25F illustrate a further embodiment of an access catheter in accordance with the present disclosure.
Figure 24B:
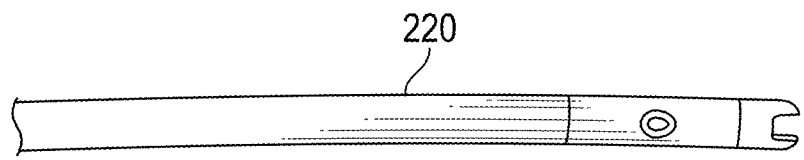
Figure 24C:
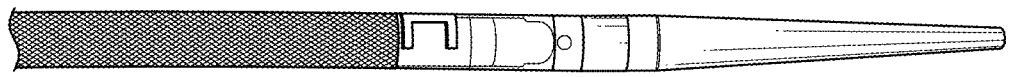
Figure 24D:
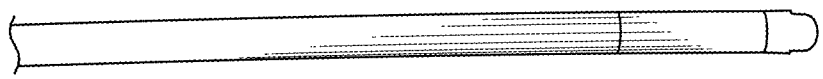
Figure 24E:
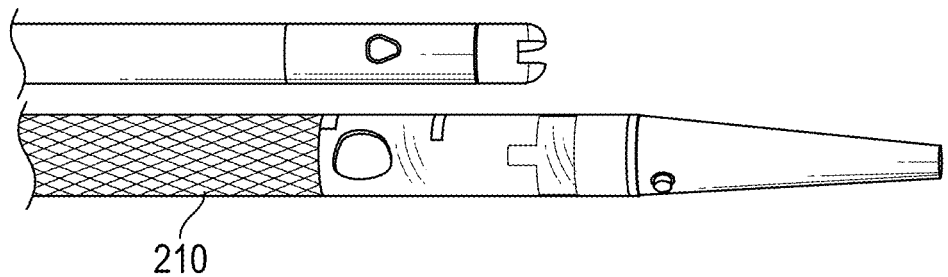
Figure 24F:
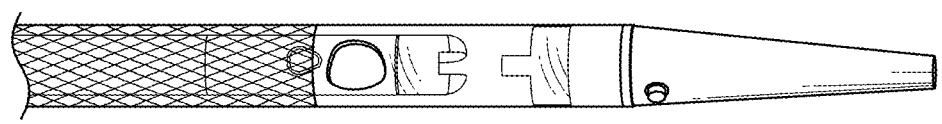
Figure 24G:
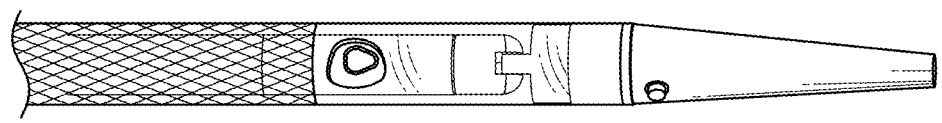
Figure 24H:
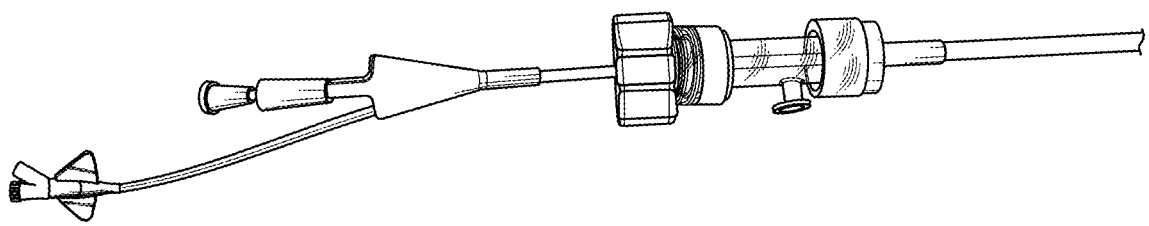
Figure 25A:
Figure 25B:
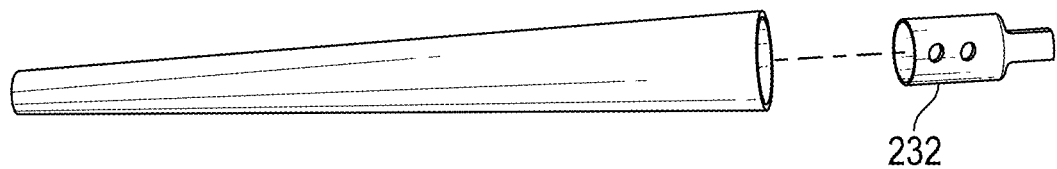
Figure 25C:
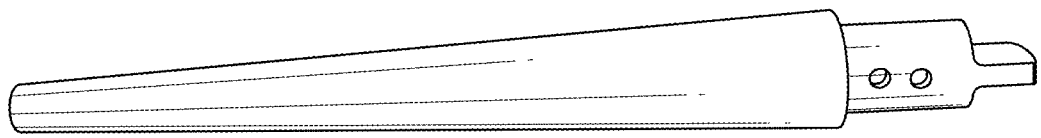
Figure 25D:
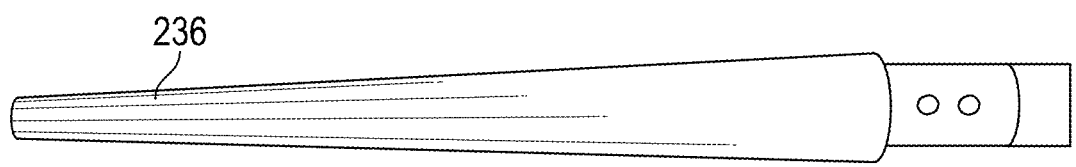
Figure 25E:
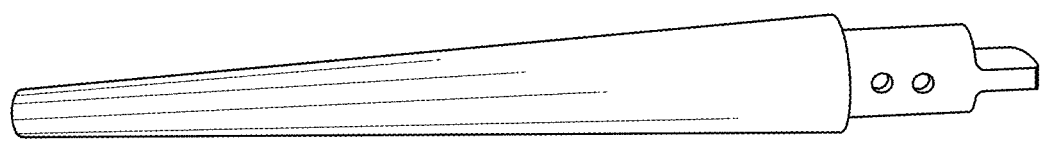
Figure 25F:
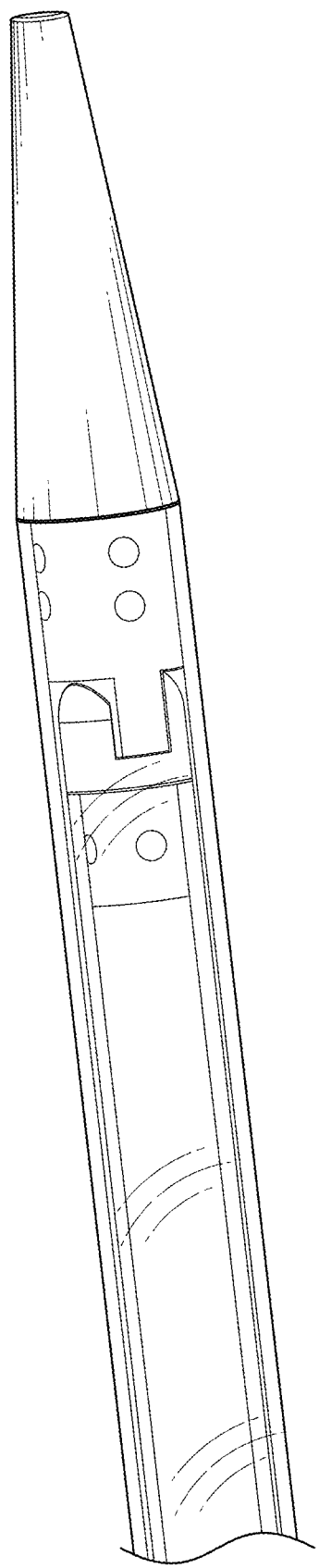

FIGS. 24A-25F illustrate a further embodiment 200 of an access catheter in accordance with the present disclosure. Embodiment 200 includes a matching marker similar to marker 40 on each of the inner catheter tube 220 and outer tube 210. Each said marker is aligned with the open port as in the prior embodiment. Thus, in use, the cardiologist can visualize placement of the inner and outer catheter tubes by aligning the spine portion of each marker on top of each other. This ensures that the ports are aligned and the poker can be deployed laterally outwardly with respect to the guidewire, to then permit the crossing wire to be deployed from the poker, and into the tissue. Catheter 200 includes a similar keyed feature to rotationally join the inner and outer catheters as with embodiment 100. FIGS. 24A-B show bottom views of the combined catheter, and the removed inner catheter, respectively, in the same alignment. FIGS. 24C and 24D show the same components rotated about the longitudinal axis of the catheter by 90 degrees. FIG. 24E shows the inner and outer catheter components side by side. FIGS. 24 F and 24G show the catheters combined, wherein the ports are not aligned in FIG. 24F, but are aligned in FIG. 24G. FIGS. 25A-C show an initial tip that is machined down and combined with element 232 to form the distal tip of the catheter 200.

Figure 26B:
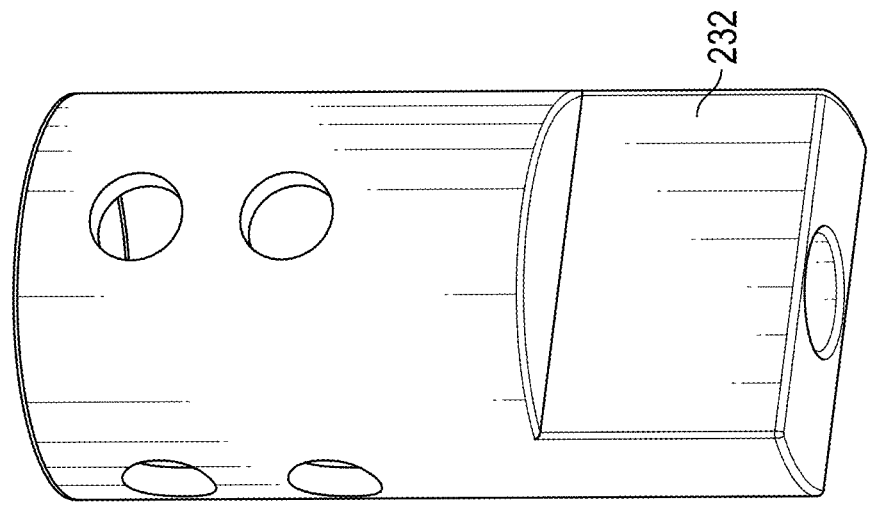
Figure 26A:
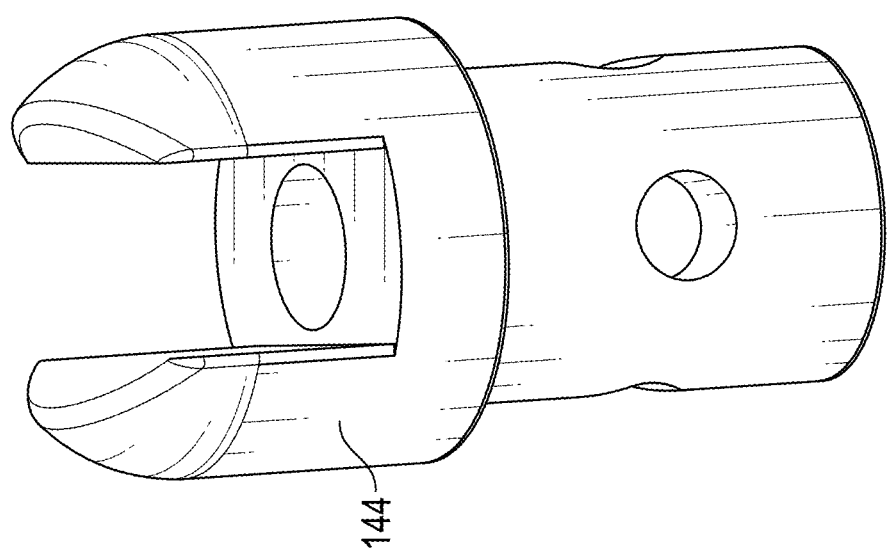
Figure 26C:
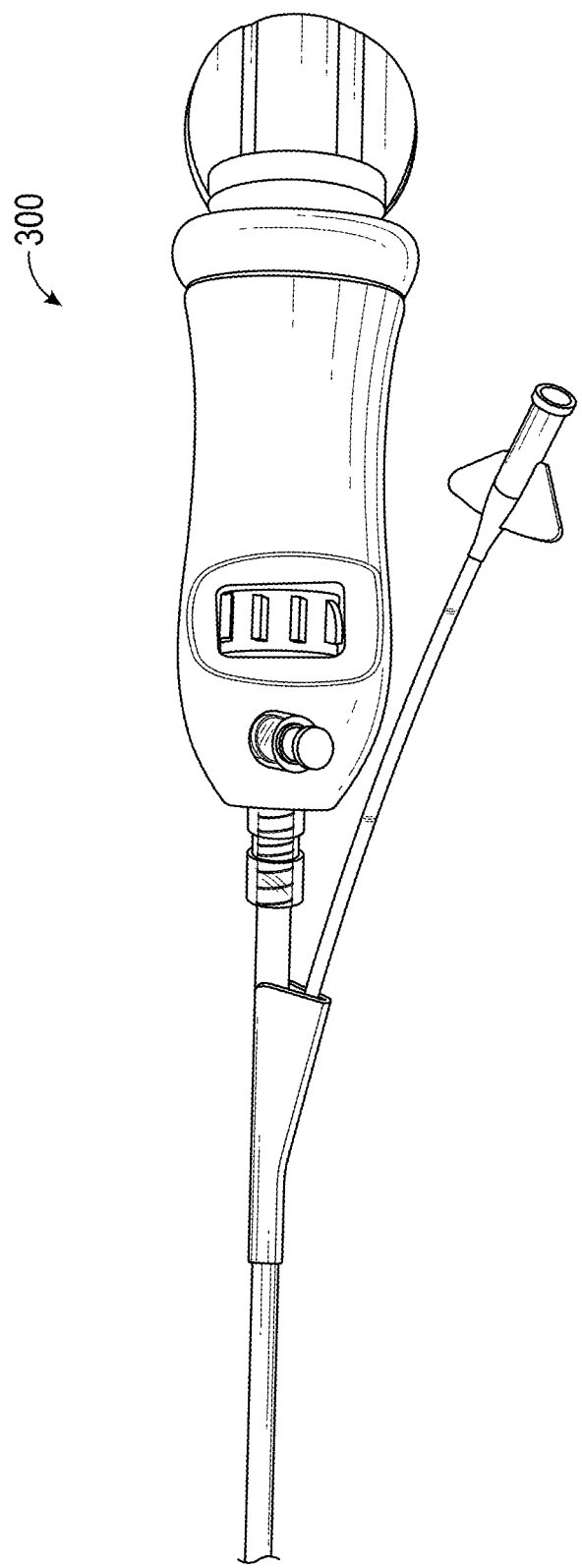
Figure 26D:
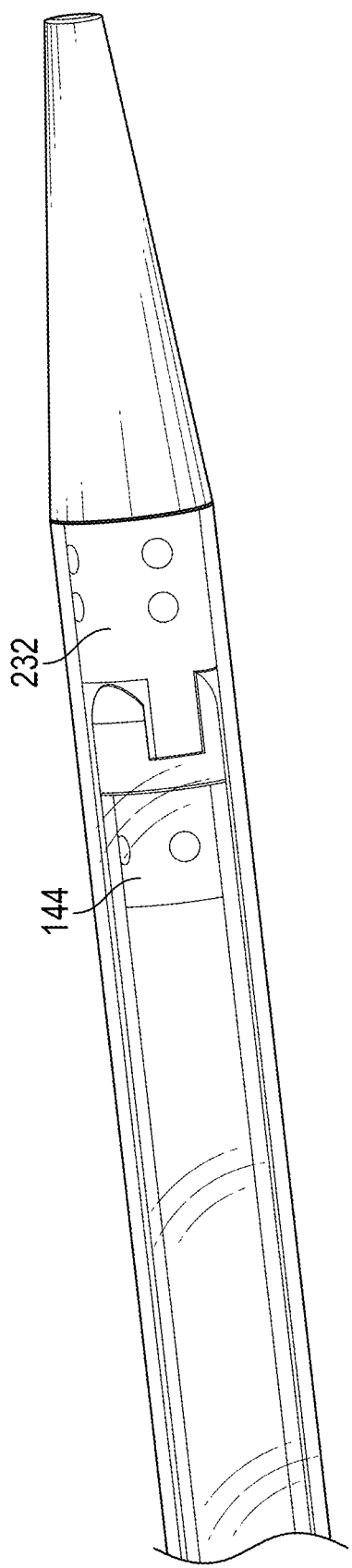

FIGS. 26A-27 illustrate yet a further embodiment 300 of an access catheter in accordance with the present disclosure. FIG. 26A illustrates a variation of tip 144, and FIG. 26B illustrates a variation of tip 132/232/142. FIG. 26C illustrates a proximal portion of the catheter 300 wherein a poker hub is provided. The proximal actuator is coupled to the poker lumen that carries and directs a crossing wire. A dial actuator is provided that can provide incremental linear advancement of the poker lumen to controllably deploy it out of the lateral ports of the catheter by way of, for example, a worm gear arrangement surrounding or otherwise coupled to the poker. The main guidewire lumen for receiving the main wire when catheter 300 is introduced is diverted down a side leg of the hub. FIGS. 26A-B provide further details on the coupling portions of the inner poker shaft tip (intermediate catheter) that is received by the keyed connection of the outer catheter shaft tip. Openings are provided in both components to permit reflow of tubular material when being heated to flow into the cavities to enhance the bond strength of the tubular portions to the tip portions. FIG. 27 illustrates an up close view of the outer catheter with the inner poker shaft removed, showing alignment of the spine of the marker band of the other catheter as being opposite to the lateral exit port.

Figure 28A:
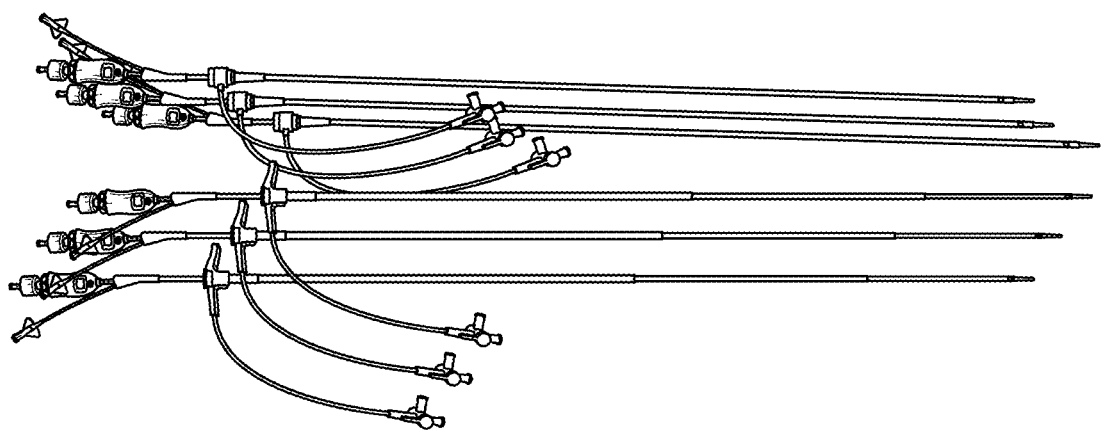
FIGS. 28A-28C illustrate assemblies of inner and outer catheter components in accordance with the present disclosure.
Figure 28B:
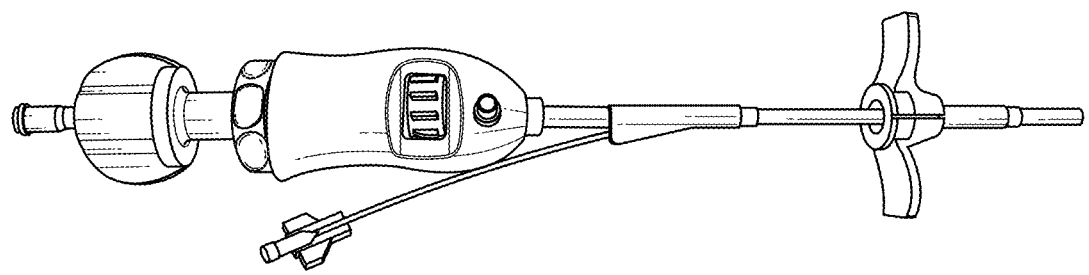
Figure 28C:
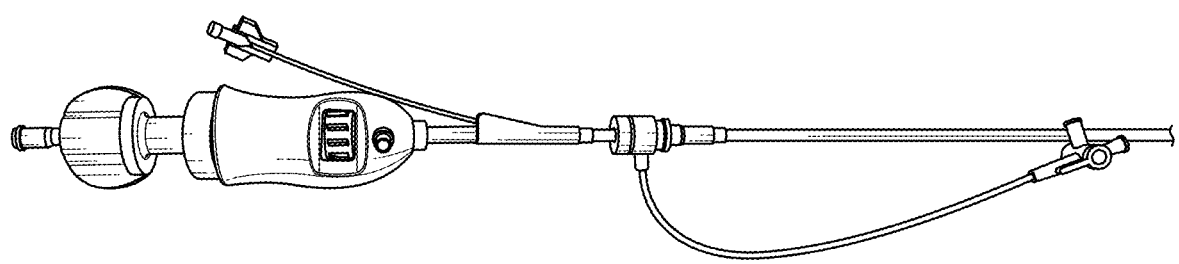
Figure 30D:
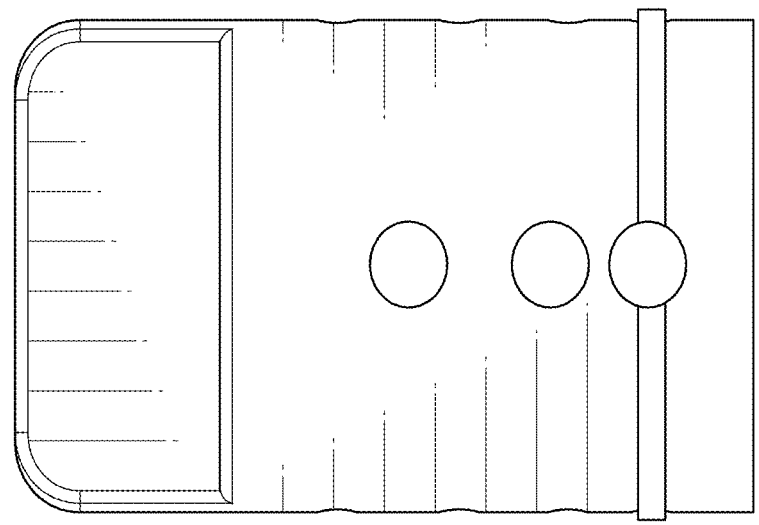
Figure 30E:
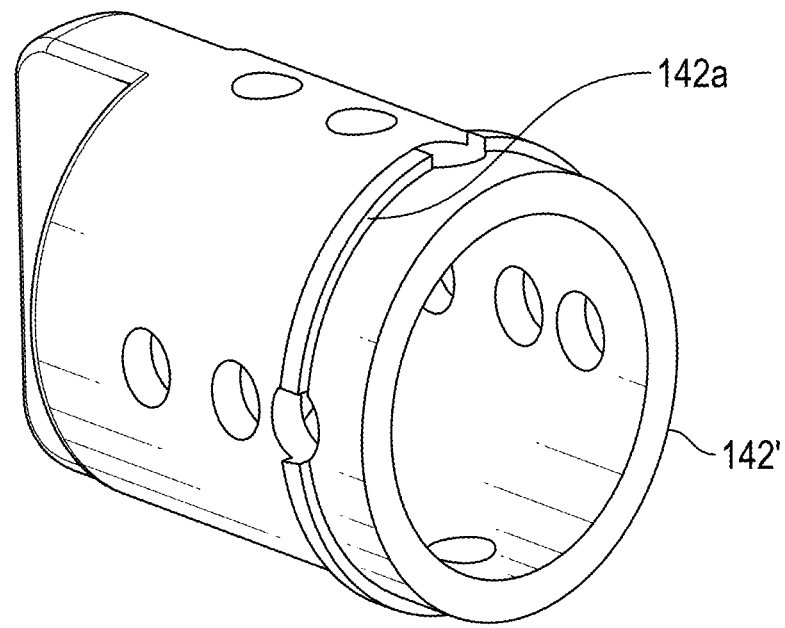
Figure 30F:
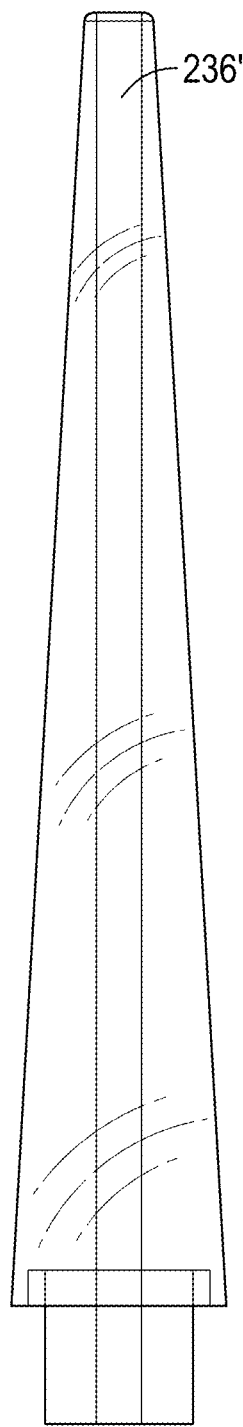
Figure 30G:
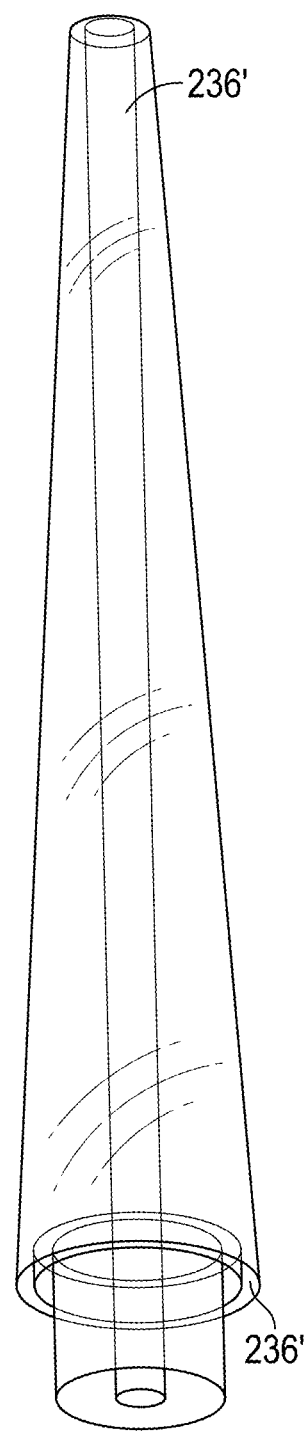
Figure 30H:
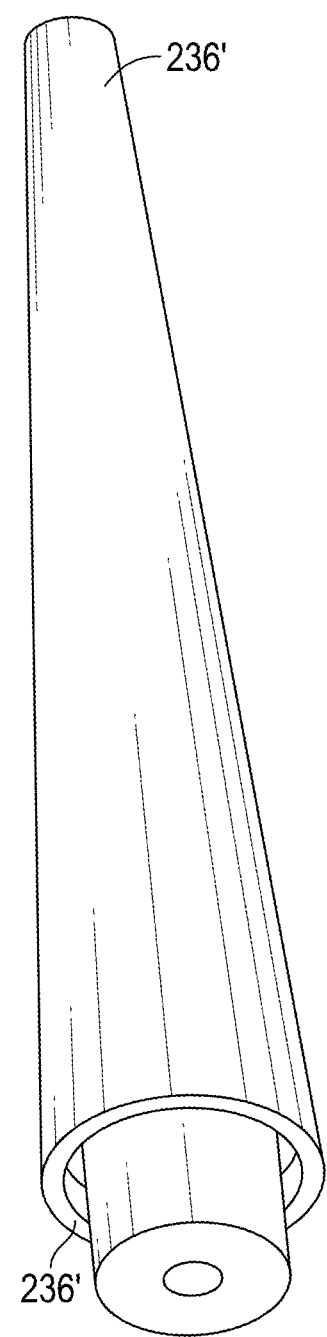

FIGS. 28A-28C illustrate assemblies of inner and outer catheter components in accordance with the present disclosure. FIG. 28B illustrates an outer catheter, and FIG. 28C shows an inner catheter assembly. FIGS. 29A-29D illustrate yet further aspects of an illustrative catheter in accordance with the present disclosure, wherein FIG. 29 shows alignment of the ports of the inner and outer catheters, FIG. 29B shows the assembly rotated 90 degrees, FIG. 29C shows deployment of the poker tube (e.g., 24) laterally outwardly from the ports 116, 126, and FIG. 29D. shows the outer catheter with the inner portions removed. This will typically involve the crossing wire being left in place exiting the large lateral port, permitting other catheters to be introduced over the crossing wire through the lateral exit port. FIGS. 30A-30H present illustrative examples of distal tip construction of catheters in accordance with the present disclosure. FIG. 30A shows the distal portion of the outer catheter of an access catheter disassembled, FIG. 30B shows the catheter partially assembled, and 30C shows the outer catheter fully assembled. FIGS. 30D and E show various portions of the keyed component of the outer catheter in side and isometric views, and FIGS. 30F-H show transparent and solid views of the structure of the tip of the catheter showing relative placement of the guidewire lumen therethrough. Component 142' can be provided with a partial or full circumferential lip or boss 142*a* that is received within annulus 236*a*' of tip 236'.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

Additionally, as used herein, the phrase "at least one of [X] and [Y]," where X and Y are different components that may be included in an embodiment of the present disclosure, means that the embodiment could include component X without component Y, the embodiment could include the component Y without component X, or the embodiment could include both components X and Y. Similarly, when used with respect to three or more components, such as "at least one of [X], [Y], and [Z]," the phrase means that the embodiment could include any one of the three or more components, any combination or sub-combination of any of the components, or all of the components.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A catheter to provide lateral access to a target location inside a tissue structure, comprising:
    an outer elongate body having a respective proximal end, a respective distal end and defining a longitudinal axis of the catheter, the outer elongate body defining an interior channel along its length, the interior channel having a transverse width, the outer elongate body defining a first lateral opening therethrough proximate the distal end thereof, wherein the interior channel extends distally at least as far as a portion of the first lateral opening;
    an intermediate elongate body having a respective proximal end, a respective distal end and an interior channel along its length, the intermediate elongate body defining a second lateral opening therethrough proximate the distal end thereof, wherein the interior channel of the outer elongate body is configured to accommodate a distal region of the intermediate elongate body therein to permit the second lateral opening to be aligned with the first lateral opening, the second lateral opening being coincident with a distal end of the interior channel of the intermediate elongate body, the intermediate elongate body defining an exterior diameter along its length that is more than half of the diameter of the interior channel of the outer elongate body to permit rotation of the intermediate elongate body within the outer elongate body about the longitudinal axis;
    a transverse accessor body having a proximal end and a distal end and defining a passageway along at least a portion of a length of the transverse accessor body, the passageway having a proximal opening and a distal opening, wherein the transverse accessor body is slidably disposed within the channel of the intermediate elongate body; and further wherein a distal end region of the transverse accessor body including the distal opening is imparted with shape memory that causes the distal end region of the transverse accessor body to bend away from the outer elongate body and intermediate elongate body after the distal end of the transverse accessor body is advanced through the first lateral opening and the second lateral opening; and
    an electrosurgical guidewire slidably disposed within the passageway of the transverse accessor body, wherein a distal end of the guidewire is configured to be advanced out of the distal opening of the passageway of the transverse accessor body along a trajectory that is perpendicular or oblique with respect to the longitudinal axis of the catheter to permit the electrosurgical guidewire to be introduced into myocardial tissue adjacent the catheter.

2. The catheter of claim 1, wherein the distal end region of the intermediate elongate body is defined at least in part by an exterior surface that is configured to interlock with a complementary interior surface defined on the outer elongate body when the first lateral opening and second lateral opening are aligned to prevent relative rotation of the intermediate elongate body with the outer elongate body.

3. The catheter of claim 2, wherein the intermediate elongate body is interlocked with the outer elongate body by advancing the intermediate elongate body distally into a distal region of the channel of the outer elongate body.

4. The catheter of claim 1, wherein the transverse accessor body is defined at least in part by a tubular elongate body.

5. The catheter of claim 1, wherein the transverse accessor body is operably coupled to an actuator, the actuator being configured to permit a user to incrementally deploy the distal end of the transverse accessor body out through the first lateral opening and the second lateral opening.

6. The catheter of claim 5, wherein the first actuator comprises a dial actuator.

7. The catheter of claim 1, wherein at least one of the outer elongate body and intermediate elongate body includes a rotational marker to permit a user to determine the rotational orientation of said at least one of the outer elongate body and intermediate elongate body with respect to surrounding anatomy under a visualization modality, wherein the rotational marker includes at least one circular loop of radiopaque material that traverses the full circumference of the at least one of the outer elongate body and intermediate elongate body.

8. The catheter of claim 7, wherein each of the outer elongate body and intermediate elongate body includes said rotational marker.

9. The catheter of claim 7, wherein the rotational marker axially straddles at least one of the first lateral opening and the second lateral opening.

10. The catheter of claim 1, further comprising an annularly-shaped inflatable member disposed about the outer elongate body disposed at least partially proximally with respect to the first lateral opening.

11. The catheter of claim 10, further comprising a second inflatable member disposed on an outer surface of the outer elongate body located on a side of the outer elongate body opposite the first lateral opening located distally with respect to the first lateral opening.

12. The catheter of claim 1, further comprising an inflatable member disposed on an outer surface of the outer elongate body located on a side of the outer elongate body opposite the first lateral opening located distally with respect to the first lateral opening.

13. A catheter to provide lateral access to a target location inside a tissue structure, comprising:

an outer elongate body having a respective proximal end, a respective distal end and defining a longitudinal axis of the access catheter, the outer elongate body defining an interior channel along its length, the interior channel having a transverse width, the outer elongate body defining a first lateral opening therethrough proximate the distal end thereof, wherein the interior channel extends distally at least as far as a portion of the first lateral opening;

a transverse accessor body having a proximal end and a distal end and defining a passageway along at least a portion of a length of the transverse accessor body, the passageway having a proximal opening and a distal opening, wherein the transverse accessor body is slidably disposed within the channel of the outer elongate body; and further wherein a distal end region of the transverse accessor body is imparted with shape memory that causes the distal end region of the transverse accessor body to bend away from the outer elongate body after the distal end of the transverse accessor body is advanced through the first lateral opening of the outer elongate body; and an electrosurgical guidewire slidably disposed within the passageway of the transverse accessor body, wherein a distal end of the guidewire is configured to be advanced out of the distal opening of the passageway of the transverse accessor body along a trajectory that is perpendicular or oblique with respect to the longitudinal axis of the catheter to permit the electrosurgical guidewire to be introduced into myocardial tissue adjacent the catheter.

14. The catheter of claim 13, further comprising an inflatable member disposed on an outer surface of the outer elongate body located on a side of the outer elongate body opposite the first lateral opening located distally with respect to the first lateral opening.

15. The catheter of claim 13, wherein the outer elongate body includes a rotational marker traversing a full circumference of the outer elongate body to permit a user to determine the rotational orientation of the outer elongate body under a visualization modality, and further wherein the rotational marker axially straddles the first lateral opening.

16. The catheter of claim 13, wherein the transverse accessor body is operably coupled to an actuator, the actuator being configured to permit a user to incrementally deploy the distal end of the transverse accessor body out through the first lateral opening.

17. The catheter of claim 16, wherein the first actuator comprises a dial actuator.

18. A catheter to provide lateral access to a target location inside a tissue structure, comprising:

an outer elongate body having a respective proximal end, a respective distal end and defining a longitudinal axis of the catheter, the outer elongate body defining an interior channel along its length, the interior channel having a transverse width, the outer elongate body defining a first lateral opening therethrough proximate the distal end thereof, wherein the interior channel extends distally at least as far as a portion of the first lateral opening, wherein the outer elongate body includes a rotational marker that traverses a full circumference of the outer elongate body to permit a user to determine the rotational orientation of the outer elongate body under a visualization modality, and further wherein the rotational marker axially straddles the first lateral opening; and a transverse accessor body having a proximal end and a distal end and defining a passageway along at least a portion of a length of the transverse accessor body, the passageway having a proximal opening and a distal opening, wherein the transverse accessor body is slidably disposed within the channel of the outer elongate body; and further wherein a distal end region of the transverse accessor body is imparted with shape memory that causes the distal end region of the transverse accessor body to bend away from the outer elongate body after the distal end of the transverse accessor body is advanced through the first lateral opening of the outer elongate body; and an electrosurgical guidewire slidably disposed within the passageway of the transverse accessor body, wherein a distal end of the guidewire is configured to be advanced out of the distal opening of the passageway of the transverse accessor body along a trajectory that is perpendicular or oblique with respect to the longitudinal axis of the catheter to permit the electrosurgical guidewire to be introduced into myocardial tissue adjacent the catheter.

19. The catheter of claim 18, wherein the rotational marker comprises radiopaque material to make the rotational marker visible under fluoroscopy.

20. The catheter of claim 18, wherein the rotational marker at least partially surrounds the first lateral opening.

* * * * *